(12) United States Patent
Wang

(10) Patent No.: US 12,524,141 B2
(45) Date of Patent: Jan. 13, 2026

(54) MULTI-TASK MANAGEMENT METHOD AND TERMINAL DEVICE

(71) Applicant: Honor Device Co., Ltd., Shenzhen (CN)

(72) Inventor: Xiaoyang Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 29 days.

(21) Appl. No.: 17/916,228

(22) PCT Filed: Apr. 26, 2022

(86) PCT No.: PCT/CN2022/089235
§ 371 (c)(1),
(2) Date: Sep. 30, 2022

(87) PCT Pub. No.: WO2023/010904
PCT Pub. Date: Feb. 9, 2023

(65) Prior Publication Data
US 2024/0211125 A1   Jun. 27, 2024

(30) Foreign Application Priority Data

Aug. 4, 2021  (CN) .......................... 202110888606.3

(51) Int. Cl.
*G06F 3/0486*  (2013.01)
*G06F 3/0481*  (2022.01)
(Continued)

(52) U.S. Cl.
CPC .......... *G06F 3/0486* (2013.01); *G06F 3/0481* (2013.01); *G06F 3/04817* (2013.01);
(Continued)

(58) Field of Classification Search
CPC .... G06F 3/0486; G06F 3/0481; G06F 3/0488; G06F 9/44594; G06F 2203/04803
See application file for complete search history.

(56) References Cited

U.S. PATENT DOCUMENTS 8,881,052 B2 * 11/2014 Strauss ................... G06F 9/451
715/802
2009/0093277 A1 * 4/2009 Lee ...................... G06F 3/04883
455/566

(Continued)

FOREIGN PATENT DOCUMENTS

CN   103412763 A     11/2013
CN   105446582 A  *   3/2016
(Continued)

OTHER PUBLICATIONS

Author: various Title: Task manager that can kill more than one process at once on Windows 7 Date: Dec. 11, 2015 pp. 1-4 (Year: 2015).*

*Primary Examiner* — Irete F Ehichioya
*Assistant Examiner* — Phoebe X Pan
(74) *Attorney, Agent, or Firm* — Leydig, Voit & Mayer, Ltd.

(57) ABSTRACT

This disclosure provides a multi-task management method and a terminal device. A terminal device detects a first instruction of a user, and displays a multi-task interface in response to the first instruction, where the multi-task interface includes a first area and a second area, a task window or a task icon of a full-screen-displayed application in a plurality of applications is displayed in the first area, and a task window or a task icon of a floating-window-displayed application in the plurality of applications is displayed in the second area. The terminal device detects a second instruction of the user, and displays a first clear button in the second area in response to the second instruction. The terminal (Continued)

device detects a third instruction of the user for the first clear button, and ends a background running process of the floating-window-displayed application in the second area in response to the third instruction.

13 Claims, 14 Drawing Sheets

(51) Int. Cl.
    *G06F 3/04817*     (2022.01)
    *G06F 3/0482*     (2013.01)
    *G06F 3/0488*     (2022.01)
    *G06F 3/04886*     (2022.01)
    *G06F 9/445*     (2018.01)

(52) U.S. Cl.
    CPC .......... *G06F 3/0482* (2013.01); *G06F 3/0488* (2013.01); *G06F 3/04886* (2013.01); *G06F 9/44594* (2013.01); *G06F 2203/04803* (2013.01)

(56) References Cited

U.S. PATENT DOCUMENTS

| | | | |
|---|---|---|---|
| 2010/0088634 A1 | 4/2010 | Tsuruta et al. | |
| 2012/0084690 A1* | 4/2012 | Sirpal | G06F 3/04886 715/835 |
| 2012/0169768 A1* | 7/2012 | Roth | G06F 3/0486 345/629 |
| 2013/0104051 A1* | 4/2013 | Reeves | G06F 1/1616 715/748 |
| 2013/0120294 A1 | 5/2013 | Sun et al. | |
| 2013/0179836 A1 | 7/2013 | Han et al. | |
| 2013/0321340 A1* | 12/2013 | Seo | G06F 3/1438 345/174 |
| 2015/0121229 A1 | 4/2015 | Wang et al. | |
| 2016/0062560 A1* | 3/2016 | Le | G06F 3/04886 715/810 |
| 2020/0241746 A1 | 7/2020 | Chen et al. | |
| 2020/0326820 A1 | 10/2020 | Walkin et al. | |
| 2021/0397309 A1 | 12/2021 | Meng et al. | |
| 2022/0050582 A1 | 2/2022 | Zhou et al. | |
| 2023/0251773 A1* | 8/2023 | Zhang | G06F 3/04842 715/765 |

FOREIGN PATENT DOCUMENTS

| | | |
|---|---|---|
| CN | 105893136 A | 8/2016 |
| CN | 106445287 A | 2/2017 |
| CN | 107037971 A | 8/2017 |
| CN | 107783830 A | 3/2018 |
| CN | 109271175 A | 1/2019 |
| CN | 109445572 A | 3/2019 |
| CN | 110531904 A | 12/2019 |
| CN | 112988282 A | 6/2021 |
| CN | 113325988 A | 8/2021 |
| EP | 2169521 A1 | 3/2010 |
| EP | 4002075 A1 | 5/2022 |
| WO | 2021012836 A1 | 1/2021 |

\* cited by examiner

200

| A terminal device detects a first instruction of a user, where the first instruction is used to open a multi-task interface, the multi-task interface is used to display a plurality of applications with background running processes, and the plurality of applications include a full-screen-displayed application and a floating-window-displayed application | — S201 |

| The terminal device displays the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area | — S202 |

| The terminal device detects a second instruction of the user, where the second instruction is used to select the second area | — S203 |

| The terminal device displays a first clear button in the second area in response to the second instruction | — S204 |

| The terminal device detects a third instruction of the user for the first clear button, and ends a background running process of the floating-window-displayed application in the second area in response to the third instruction | — S205 |

FIG. 2

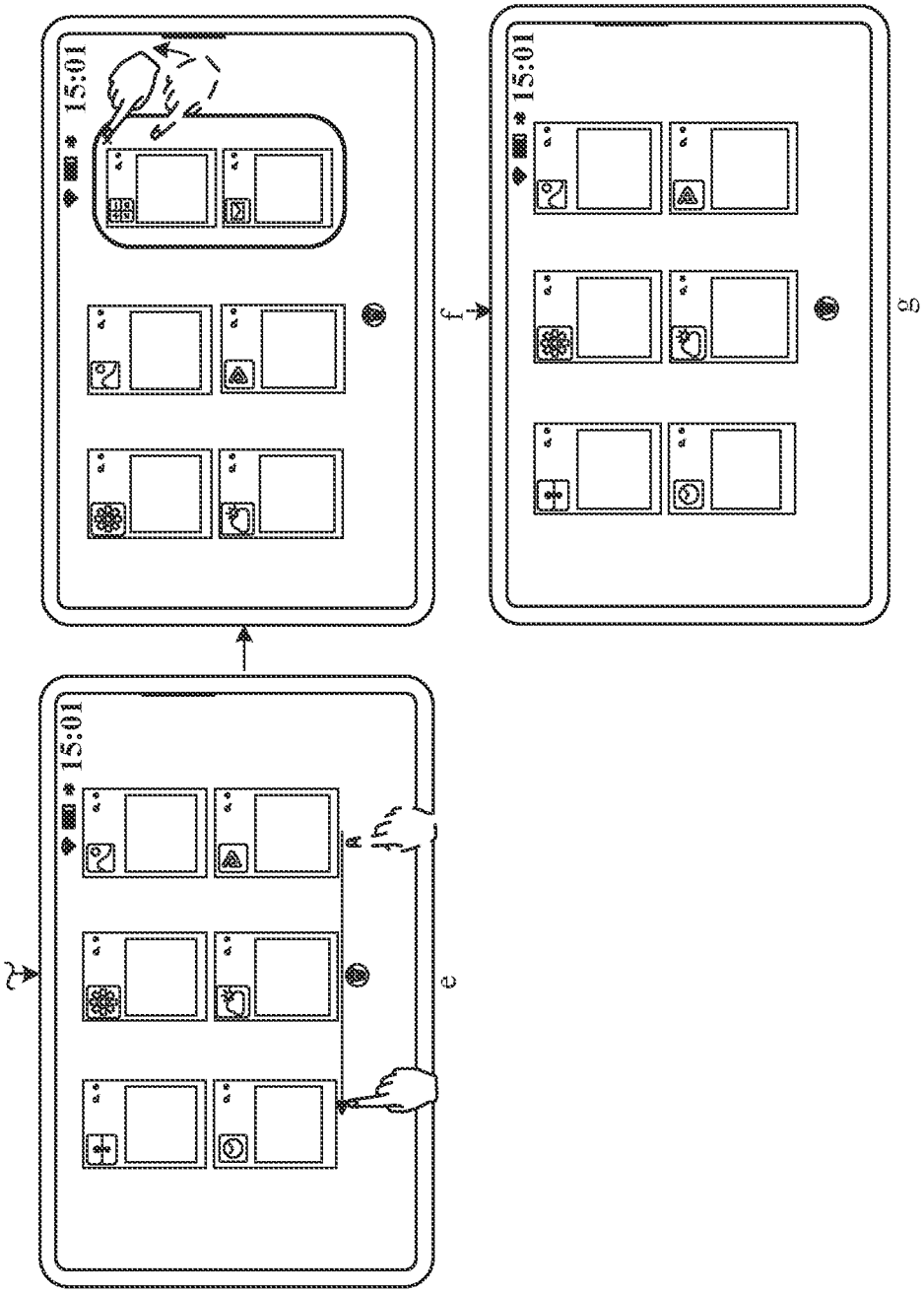

MULTI-TASK MANAGEMENT METHOD AND TERMINAL DEVICE

CROSS-REFERENCE TO RELATED APPLICATIONS

This application is a National Stage of International Application No. PCT/CN2022/089235, filed on Apr. 26, 2022, which claims priority to Chinese Patent Application No. 202110888606.3, filed on Aug. 4, 2021. The disclosures of both the aforementioned applications are hereby incorporated by reference in their entireties.

TECHNICAL FIELD

This application relates to the field of terminals, and in particular, to a multi-task management method and a terminal device.

BACKGROUND

With flourishing development of various applications (APPs or apps), a plurality of transactions may be operated on a terminal device (for example, a mobile phone) through applications, and people use more applications in daily life. Generally, an application that is being used by a user is in a full-screen-displayed state by default, and an application in a full-screen-displayed state may be referred to as a "full-screen-displayed application". However, because only one full-screen-displayed application can run in the foreground at a time, a requirement of the user for viewing a plurality of applications simultaneously cannot be met (that is, the plurality of applications cannot run in the foreground simultaneously). To achieve better user experience, based on the user requirement, the terminal device may enable a function in which some applications can be displayed in small windows. The small window occupies a part of an entire screen of the terminal device, and may be referred to as a floating window. An application in a floating-window-displayed state may be referred to as a "floating-window-displayed application". In this way, if a plurality of applications run in the foreground simultaneously, and the plurality of applications include one full-screen-displayed application and at least one floating-window-displayed application, the user can conveniently and quickly switch between the plurality of applications.

In addition to the foregoing applications running in the foreground, the terminal device further includes other applications running in the background. These applications all have background running processes. The user may manage the applications with the background running processes, to improve performance of the terminal device. Currently, a management operation performed by the terminal device on a full-screen-displayed application with a background running process and a floating-window-displayed application with a background running process is cumbersome and inflexible, resulting in poor user experience.

SUMMARY

This application provides a multi-task management method and a terminal device, to implement unified management on a floating-window-displayed application with a background running process, so as to improve user experience.

According to a first aspect, a multi-task management method is provided, and includes: A terminal device detects a first instruction of a user, where the first instruction is used to open a multi-task interface, the multi-task interface is used to display a plurality of applications with background running processes, and the plurality of applications include a full-screen-displayed application and a floating-window-displayed application; the terminal device displays the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area; the terminal device detects a second instruction of the user, where the second instruction is used to select the second area; the terminal device displays a first clear button in the second area in response to the second instruction; and the terminal device detects a third instruction of the user for the first clear button, and ends a background running process of the floating-window-displayed application in the second area in response to the third instruction.

In this embodiment of this application, the full-screen-displayed application with a background running process and the floating-window-displayed application with a background running process are displayed in a same multi-task interface, the full-screen-displayed application is displayed in one display area in the multi-task interface, and the floating-window-displayed application is displayed in another display area in the multi-task interface. The user may select the area for displaying the floating-window-displayed application, to clear all floating-window-displayed applications in the area. That is, in this application, in a case that operation complexity is reduced, the floating-window-displayed applications are further cleared together, so that user experience is improved.

With reference to the first aspect, in some implementations of the first aspect, a second clear button is displayed in the multi-task interface. Before the terminal device detects the second instruction of the user, the method further includes: The terminal device detects a fourth instruction of the user, where the fourth instruction is used to select at least one application in the plurality of applications; the terminal device displays a selection button of each application in the plurality of applications on a task window or a task icon of each application in response to the fourth instruction; the terminal device detects at least two fifth instructions of the user for at least two selection buttons, where the fifth instructions are used to select a task window or a task icon of at least one full-screen-displayed application in the first area and a task window or a task icon of at least one floating-window-displayed application in the second area; the terminal device selects task windows or task icons of applications corresponding to the at least two selection buttons in response to the at least two fifth instructions; and the terminal device detects a sixth instruction of the user for the second clear button, and ends background running processes of the applications corresponding to the at least two selection buttons in response to the sixth instruction.

With reference to the first aspect, in some implementations of the first aspect, before the terminal device detects the at least two fifth instructions of the user for the at least two selection buttons, the method further includes: The terminal device detects a leftward/rightward swipe instruction of the user in the first area, and displays a task window or a task icon of another full-screen-displayed application with a background running process in response to the leftward/rightward swipe instruction; and the terminal device detects an upward/downward swipe instruction of the user in the second area, and displays a task window or a task icon of another floating displayed application with a background running process in response to the upward/downward swipe instruction.

With reference to the first aspect, in some implementations of the first aspect, a second clear button is displayed in the multi-task interface. Before the terminal device detects the second instruction of the user, the method further includes: The terminal device detects a first drag instruction of the user for a task window or a task icon of a first application in the plurality of applications, where the first drag instruction is used to drag the task window or the task icon of the first application to the second clear button; and the terminal device ends a background running process of the first application in response to the first drag instruction.

With reference to the first aspect, in some implementations of the first aspect, the multi-task interface further includes a third area, and the third area is used to display a task window or a task icon of at least one keep-alive application. Before the terminal device detects the second instruction of the user, the method further includes: The terminal device detects a second drag instruction of the user for a task window or a task icon of a second application in the plurality of applications, where the second drag instruction is used to drag the task window or the task icon of the second application to the third area; and the terminal device moves the task window or the task icon of the second application from the second area to the third area in response to the second drag instruction.

With reference to the first aspect, in some implementations of the first aspect, the second clear button is displayed in the multi-task interface. After the background running process of the floating-window-displayed application in the second area is ended, the method further includes: The terminal device detects a seventh instruction of the user for the second clear button, and ends a background running process of the full-screen-displayed application in the first area in response to the seventh instruction.

According to a second aspect, a terminal device is provided, including a detection module and a processing module. The detection module is configured to detect a first instruction of a user, where the first instruction is used to open a multi-task interface, the multi-task interface is used to display a plurality of applications with background running processes, and the plurality of applications include a full-screen-displayed application and a floating-window-displayed application. The processing module is configured to display the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area. The detection module is configured to detect a second instruction of the user, where the second instruction is used to select the second area. The processing module is configured to: display a first clear button in the second area in response to the second instruction; and detect a third instruction of the user for the first clear button, and end a background running process of the floating-window-displayed application in the second area in response to the third instruction.

With reference to the second aspect, in some implementations of the second aspect, a second clear button is displayed in the multi-task interface. The detection module is configured to detect a fourth instruction of the user, where the fourth instruction is used to select at least one application in the plurality of applications. The processing module is configured to display a selection button of each application in the plurality of applications on a task window or a task icon of each application in response to the fourth instruction. The detection module is configured to detect at least two fifth instructions of the user for at least two selection buttons, where the fifth instructions are used to select a task window or a task icon of at least one full-screen-displayed application in the first area and a task window or a task icon of at least one floating-window-displayed application in the second area. The processing module is configured to: select task windows or task icons of applications corresponding to the at least two selection buttons in response to the at least two fifth instructions; and detect a sixth instruction of the user for the second clear button, and end background running processes of the applications corresponding to the at least two selection buttons in response to the sixth instruction.

With reference to the second aspect, in some implementations of the second aspect, the processing module is configured to: detect a leftward/rightward swipe instruction of the user in the first area, and display a task window or a task icon of another full-screen-displayed application with a background running process in response to the leftward/rightward swipe instruction; and detect an upward/downward swipe instruction of the user in the second area, and display a task window or a task icon of another floating displayed application with a background running process in response to the upward/downward swipe instruction.

With reference to the second aspect, in some implementations of the second aspect, a second clear button is displayed in the multi-task interface. The detection module is configured to detect a first drag instruction of the user for a task window or a task icon of a first application in the plurality of applications, where the first drag instruction is used to drag the task window or the task icon of the first application to the second clear button. The processing module is configured to end a background running process of the first application in response to the first drag instruction.

With reference to the second aspect, in some implementations of the second aspect, the multi-task interface further includes a third area, and the third area is used to display a task window or a task icon of at least one keep-alive application. The detection module is configured to detect a second drag instruction of the user for a task window or a task icon of a second application in the plurality of applications, where the second drag instruction is used to drag the task window or the task icon of the second application to the third area. The processing module is configured to move the task window or the task icon of the second application from the second area to the third area in response to the second drag instruction.

With reference to the second aspect, in some implementations of the second aspect, the second clear button is displayed in the multi-task interface. The processing module is configured to: detect a seventh instruction of the user for the second clear button, and end a background running process of the full-screen-displayed application in the first area in response to the seventh instruction.

According to a third aspect, another terminal device is provided, including a processor. The processor is coupled to a memory, and may be configured to execute instructions in the memory, to implement the method in any one of the possible implementations of the first aspect. Optionally, the terminal device further includes the memory. Optionally, the terminal device further includes a communications interface, and the processor and the communications interface are coupled.

According to a fourth aspect, a processor is provided, including an input circuit, an output circuit, and a processing circuit. The processing circuit is configured to receive a signal through the input circuit, and transmit a signal through the output circuit, so that the processor performs the method in any one of the possible implementations of the first aspect.

In a specific implementation process, the processor may be a chip, the input circuit may be an input pin, the output circuit may be an output pin, and the processing circuit may be a transistor, a gate circuit, a trigger, various logic circuits, or the like. An input signal that is received by the input circuit may be received and input by, for example, a receiver, but this is not limited. A signal that is output by the output circuit may be, for example, output to a transmitter and transmitted by the transmitter, but this is not limited. The input circuit and the output circuit may be a same circuit. The circuit is separately used as the input circuit and the output circuit at different moments. In this embodiment of this application, specific implementations of the processor and various circuits are not limited.

According to a fifth aspect, a processing apparatus is provided, including a processor and a memory. The processor is configured to read instructions stored in the memory, receive a signal through a receiver, and transmit a signal through a transmitter, to perform the method in any one of the possible implementations of the first aspect.

Optionally, there are one or more processors, and there are one or more memories.

Optionally, the memory may be integrated with the processor, or the memory may be disposed separately from the processor.

In a specific implementation process, the memory may be a non-transitory memory such as a read-only memory (ROM). The memory and the processor may be integrated on a same chip, or may be separately disposed on different chips. In this embodiment of this application, neither a type of the memory nor a disposing manner of the memory and the processor is limited.

It should be understood that for a related data exchange process, for example, indication information sending may be a process of outputting indication information from the processor, and capability information receiving may be a process of receiving input capability information by the processor. Specifically, data that is output by the processor may be output to the transmitter, and input data received by the processor may be from the receiver. The transmitter and the receiver may be collectively referred to as a transceiver.

The processing apparatus in the fifth aspect may be a chip. The processor may be implemented through hardware, or may be implemented through software. When the processor is implemented through hardware, the processor may be a logic circuit, an integrated circuit, or the like. When the processor is implemented through software, the processor may be a general-purpose processor, and is implemented by reading software code stored in the memory. The memory may be integrated into the processor, or may be located outside the processor and exist independently.

According to a sixth aspect, a computer program product is provided. The computer program product includes a computer program (which may also be referred to as code or instructions). When the computer program is run, a computer is enabled to perform the method in any one of the possible implementations of the first aspect.

According to a seventh aspect, a computer-readable storage medium is provided. The computer-readable storage medium stores a computer program (which may also be referred to as code or instructions). When the computer program is run on a computer, the computer is enabled to perform the method in any one of the possible implementations of the first aspect.

BRIEF DESCRIPTION OF DRAWINGS

FIG. 2 is a schematic flowchart of a multi-task management method according to an embodiment of this application;

FIG. 3A and FIG. 3B are a schematic diagram of a tablet computer interface of multi-task management according to an embodiment of this application;

DESCRIPTION OF EMBODIMENTS

Figure 1:
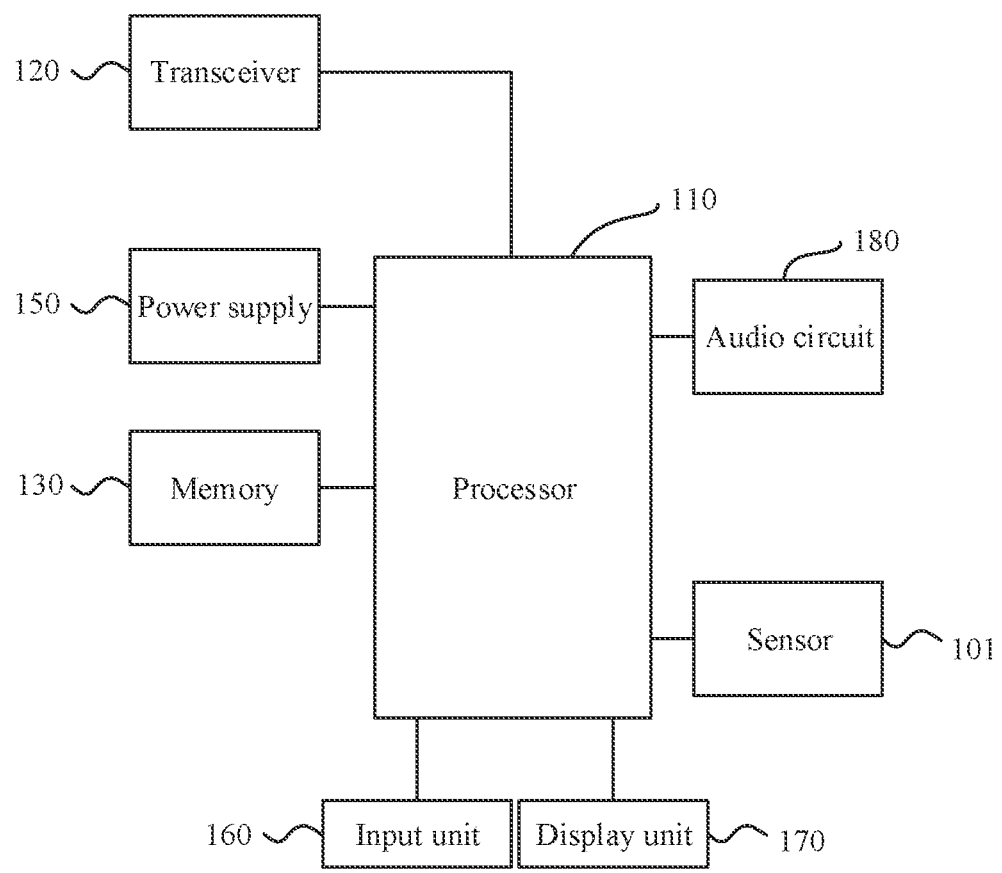
FIG. 1 is a schematic diagram of a system architecture of a terminal device according to an embodiment of this application.

The following describes the technical solutions in this application with reference to the accompanying drawings.

For ease of clearly describing the technical solutions in embodiments of this application, in embodiments of this application, the words such as "first" and "second" are used to distinguish between same items or similar items whose functions are basically the same. For example, a first instruction and a second instruction are used to distinguish between different user instructions, and a sequence thereof is not limited. A person skilled in the art may understand that the words such as "first" and "second" do not limit a quantity and an execution order, and the words such as "first" and "second" do not necessarily indicate a difference.

It should be noted that in this application, words such as "example" or "for example" are used to represent giving an example, an illustration, or a description. In this application, no embodiment or design scheme that is described as "example" or "for example" should be construed as being more preferred or advantageous than other embodiments or design schemes. Specifically, the words such as "example" or "for example" are used to present related concepts in a specific manner.

In addition, "at least one" refers to one or more, and "a plurality of" refers to two or more. The term "and/or" describes an association relationship of associated objects, and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items (pieces)" or a similar expression means any combination of these items, including a single item (piece) or any combination of a plurality of items (pieces). For example, at least one of a, b, and c may represent a, b, c, a and b, a and c, b and c, or a, b, and c, where a, b, and c may be singular or plural.

A terminal device in embodiments of this application may be a mobile phone, a tablet computer, a laptop computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a personal digital assistant (PDA), or the like. This is not limited in embodiments of this application.

To make the objectives and technical solutions of this application clearer and more intuitive, the following describes a method and a terminal device provided in embodiments of this application in detail with reference to the accompanying drawings and the embodiments. It should be understood that a specific embodiment described herein is merely used to explain this application, but is not used to limit this application.

For example, FIG. 1 is a schematic diagram of a system architecture of a terminal device according to an embodiment of this application.

As shown in FIG. 1, the terminal device includes a processor 110, a transceiver 120, and a display unit 170. The display unit 170 may include a display.

Optionally, the terminal device may further include a memory 130. The processor 110, the transceiver 120, and the memory 130 may communicate with each other through an internal connection path, to transmit control signals and/or data signals. The memory 130 is configured to store a computer program, and the processor 110 is configured to invoke the computer program from the memory 130 and run the computer program.

The processor 110 and the memory 130 may be combined into a processing apparatus. More commonly, the processor 110 and the memory 130 are independent components, and the processor 110 is configured to execute program code that is stored in the memory 130 to implement the foregoing functions. During specific implementation, the memory 130 may alternatively be integrated into the processor 110, or is independent of the processor 110.

In addition, to improve a function of the terminal device, the terminal device may further include one or more of an input unit 160, an audio circuit 180, and a sensor 101.

Optionally, the terminal device may further include a power supply 150, configured to supply power to various components or circuits in the terminal device.

It may be understood that operations and/or functions of modules in the terminal device shown in FIG. 1 are separately used to implement corresponding procedures in the following method embodiments. For details, refer to the descriptions in the following method embodiments. To avoid repetition, detailed descriptions are appropriately omitted herein.

It may be understood that the processor 110 in the terminal device shown in FIG. 1 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The processor 110 may further be provided with a memory, configured to store instructions and data. In some embodiments, the memory in the processor 110 is a cache. The memory may store instructions or data just used or cyclically used by the processor 110. If the processor 110 needs to use the instructions or the data again, the instructions or the data may be directly invoked from the memory. Repeated access is avoided, and waiting time of the processor 110 is reduced, so that system efficiency is improved.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The UART interface is a universal serial data bus, and is used for asynchronous communication. The bus may be a bidirectional communication bus. The bus converts to-be-transmitted data between serial communication and parallel communication. In some embodiments, the UART interface is usually used to connect the processor 110 and the transceiver 120. For example, the processor 110 communicates with a Bluetooth module in the transceiver 120 through the UART interface, to implement a Bluetooth function. In some embodiments, the audio circuit 180 may transmit an audio signal to the transceiver 120 through the UART interface, to implement a function of playing music through a Bluetooth headset.

The MIPI interface may be used to connect the processor 110 and a peripheral component such as the display unit 170. The MIPI interface includes a camera serial interface (CSI), a display serial interface (DSI), or the like. In some embodiments, the processor 110 and the display unit 170 communicate with each other through the DSI interface, to implement a display function of the terminal device.

The GPIO interface may be configured through software. The GPIO interface may be configured as a control signal, or may be configured as a data signal. In some embodiments, the GPIO interface may be used to connect the processor 110 to the display unit 170, the transceiver 120, the audio circuit 180, the sensor 101, and the like. The GPIO interface may alternatively be configured as an I2C interface, an I2S interface, a UART interface, an MIPI interface, or the like.

It may be understood that the interface connection relationship between modules shown in this embodiment of this application is merely an example for description, and does not constitute a structural limitation on the terminal device. In some other embodiments of this application, the terminal device may alternatively use an interface connection manner different from that in the foregoing embodiment or a combination of a plurality of interface connection manners.

It may be understood that the power supply 150 shown in FIG. 1 is configured to supply power to the processor 110, the memory 130, the display unit 170, a camera 190, the input unit 160, the transceiver 120, and the like.

The transceiver 120 may provide a solution that is applied to the terminal device and includes wireless communications such as a wireless local area network (WLAN) (such as a wireless fidelity (Wi-Fi) network), Bluetooth (BT), a global navigation satellite system (GNSS), frequency modulation (FM), near field communication (NFC), and infrared (IR). The transceiver 120 may be one or more components integrating at least one communications processing module.

The terminal device implements a display function though the GPU, the display unit 170, the application processor, and the like. The GPU is a microprocessor for image processing, and is connected to the display unit 170 and the application processor. The GPU is configured to perform mathematical and geometric calculation, and render graphics. The processor 110 may include one or more GPUs that execute program instructions to generate or change display information.

The display unit 170 is configured to display an image, a video, and the like. The display unit 170 includes a display panel. The display panel may use a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal device may include one or N display units 170, where N is a positive integer greater than 1.

The memory 130 may be configured to store computer executable program code, and the executable program code includes instructions. The memory 130 may include a program storage area and a data storage area. The program storage area may store an operating system, an application program required by at least one function (for example, a sound playing function or an image playing function), and the like. The data storage area may store data (such as audio data or a phone book) created in a use process of the terminal device, and the like. In addition, the memory 130 may include a high-speed random access memory, and may further include a non-volatile memory, such as at least one magnetic disk storage device, a flash memory device, and a universal flash storage (UFS). The processor 110 executes various functional applications and data processing of the terminal device by running the instructions stored in the memory 130 and/or the instructions stored in the memory disposed in the processor.

The terminal device may implement an audio function such as music playing or recording through the audio circuit 180, the application processor, and the like.

The audio circuit 180 is configured to convert digital audio information into an analog audio signal for output, and is also configured to convert analog audio input into a digital audio signal. The audio circuit 180 may be further configured to encode and decode audio signals. In some embodiments, the audio circuit 180 may be disposed in the processor 110, or some functional modules of the audio circuit 180 may be disposed in the processor 110.

With flourishing development of various applications (APPs or apps), a plurality of transactions may be operated on a terminal device (for example, a mobile phone) through software, and people use more applications in daily life. Generally, an application that is being used by a user is in a full-screen-displayed state by default, and an application in a full-screen-displayed state may be referred to as a "full-screen-displayed application". However, because only one full-screen-displayed application can run in the foreground at a time, a requirement of the user for viewing a plurality of applications simultaneously cannot be met (that is, the plurality of applications cannot run in the foreground simultaneously). To achieve better user experience, based on the user requirement, the terminal device may enable, in floating window management in settings, a function in which some applications can be displayed in small windows. The small window occupies a part of an entire screen of the terminal device, and may be referred to as a floating window. An application in a floating-window-displayed state may be referred to as a "floating-window-displayed application". In this way, if a plurality of applications run in the foreground simultaneously, and the plurality of applications include one full-screen-displayed application and at least one floating-window-displayed application, the user can conveniently and quickly switch between the plurality of applications.

In addition to the foregoing applications running in the foreground, the terminal device further includes other applications running in the background. These applications all have background running processes. Therefore, each application mentioned in this application may be understood as an application with a background running process. The user may manage the applications with the background running processes through the terminal device, to improve performance of the terminal device.

It should be understood that the foregoing management may be clearing a background process of an application or keeping alive a background process of an application. In this application, clearing a background process of an application is mainly used as an example to describe a solution.

In an implementation, the user may separately manage the full-screen-displayed application and the floating-window-displayed application. This requires that the user enters different entrances through different operations. Therefore, the user cannot simultaneously clear the full-screen-displayed application and the floating-window-displayed application.

To resolve this problem, in another implementation, the terminal device may display task windows or task icons of all applications (including the full-screen-displayed application and the floating-window-displayed application) with background running processes in a same interface, so that the user simultaneously clears the background processes of all the applications in the interface.

However, when the user wants to clear all floating-window-displayed applications, the user needs to select task windows or task icons of all the floating-window-displayed applications in the interface through a plurality of tap operations, to clear all the floating-window-displayed applications. Therefore, in the foregoing method, operations are cumbersome, and user experience is poor. In addition, the floating-window-displayed applications can all be cleared through only the foregoing cumbersome operations. Therefore, in the method, there is a problem that the foregoing application with a background running process cannot be flexibly cleared.

In view of this, embodiments of this application provide a multi-task management method and a terminal device. A task window or a task icon of a full-screen-displayed application with a background running process and a task window or a task icon of a floating-window-displayed application with a background running process are displayed in different display areas in a multi-task interface. The task window or the task icon of the full-screen-displayed application is displayed in one area in the multi-task interface, and the task window or the task icon of the floating-window-displayed application is displayed in another area in the multi-task interface. Therefore, a user may select the area in which the task window or the task icon of the floating-window-displayed application is displayed, to clear all floating-window-displayed applications in the area. The method in this application is easy to operate, and requires fewer instructions compared with the foregoing selection manner using a plurality of tap operations, so that user experience is improved.

In addition, compared with the foregoing method in which a task window or a task icon of a floating-window-displayed application and a task window or a task icon of a full-screen-displayed application are displayed in a same area, in this application, the task window or the task icon of the floating-window-displayed application and the task window or the task icon of the full-screen-displayed application are separately displayed in different display areas in the multi-task interface, so that the user can more clearly and quickly recognize, in the multi-task interface, whether an application is a full-screen-displayed application or a floating-window-displayed application, and then the user can quickly select the application according to a requirement of the user. This effectively improves user satisfaction.

For example, the foregoing multi-task interface includes a highlighted area and an area other than the highlighted area. The highlighted area is used to display the task window or the task icon of the floating-window-displayed application, and the area other than the highlighted area is used to display the task window or the task icon of the full-screen-displayed application. The entire multi-task interface is different from an existing form in which task windows or task icons of all applications are laid out. The user can quickly recognize, by distinguishing between areas, whether an application is a full-screen-displayed application or a floating-window-displayed application, and then flexibly select and clear the foregoing application according to the requirement of the user.

FIG. 2 is a schematic flowchart of a multi-task management method 200 according to an embodiment of this application. As shown in FIG. 2, the method 200 includes the following steps.

S201: A terminal device detects a first instruction of a user, where the first instruction is used to open a multi-task interface, the multi-task interface is used to display a plurality of applications with background running processes, and the plurality of applications include a full-screen-displayed application and a floating-window-displayed application.

In a possible implementation, the user may open the multi-task interface of the plurality of applications with the background running processes through various gestures in which a finger slides from an edge of a display of the terminal device to a center of the display of the terminal device.

For example, the user may slide from the edge of the display of the terminal device to the center of the display of the terminal device with two fingers, or the user may slide from the bottom edge of the display of the terminal device to the center of the display of the terminal device with one finger, to open the multi-task interface of the plurality of applications with the background running processes.

S202: The terminal device displays the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area.

It should be understood that the second area may also be referred to as a highlighted area, and the first area may also be referred to as a display area other than the highlighted area. This is not limited in this application.

S203: The terminal device detects a second instruction of the user, where the second instruction is used to select the second area.

S204: The terminal device displays a first clear button in the second area in response to the second instruction.

It should be understood that the first clear button is used to indicate a clear button in the second area.

For example, the user may touch and hold a blank part in the second area until the first clear button is displayed in the upper right corner of the second area.

S205: The terminal device detects a third instruction of the user for the first clear button, and ends a background running process of the floating-window-displayed application in the second area in response to the third instruction.

For example, the user may tap the clear button, and the terminal device detects the tap operation, converts the tap operation into the third instruction, and ends the background running process of the floating-window-displayed application in the second area in response to the third instruction.

Optionally, the terminal device may alternatively clear background processes of all applications in the multi-task interface based on a user instruction.

For example, the terminal device detects an operation that the user taps a clear button (which may also be referred to as a second clear button) in the multi-task interface, converts the operation into an instruction for clearing the background processes of all the applications in the multi-task interface, and ends the background processes of all the applications in response to the instruction. In this way, the full-screen-displayed application and the floating-window-displayed application are cleared together.

Optionally, the terminal device may alternatively clear a background process of at least one application in the multi-task interface based on a user instruction.

For example, an operation that the user drags a task window or a task icon of at least one application in the multi-task interface to a clear button in the multi-task interface is detected, to clear a background process of the at least one application. The terminal device detects the operation that the user drags the task window or the task icon of the at least one application, converts the drag operation into an instruction for clearing the background process of the at least one application in the multi-task interface, and ends the background process of the at least one application in response to the instruction. In this way, the background process of the application in the multi-task interface is selectively cleared.

It should be understood that the cleared application may include an application displayed in the first area or an application displayed in the second area, or may include an application displayed in at least one first area and an application displayed in at least one second area.

It should be understood that, before S201, the terminal device may further detect an eighth instruction of the user, where the eighth instruction is used to open an application A. The application A is a full-screen-displayed application in the plurality of applications. The terminal device opens the application A in response to the eighth instruction, and enables the application A to run in the foreground. The terminal device may further detect a ninth instruction of the user, where the ninth instruction is used to open an application B. The application B is a floating-window-displayed application in the plurality of applications. The terminal device opens the application B in response to the ninth instruction, and enables the application B to also run in the foreground.

For example, when using the terminal device, the user may tap an icon of the application A in a display interface of the terminal device, to open the application A. The terminal device detects a tap operation of the user, and converts the tap operation into the foregoing instruction for opening the application A. The user may tap a side bar in a display interface of the application A, and tap an icon of the application B in a plurality of application icons displayed in the side bar. The terminal device detects a tap operation of the user, converts the tap operation into the foregoing instruction for opening the application B, and opens the application B in response to the instruction.

It should be understood that, because the application B is the floating-window-displayed application, after the application B is opened, the application A continues to run in the foreground, and the application B may be displayed on the application A in a form of a small window.

In this embodiment of this application, a full-screen-displayed application with a background running process and a floating-window-displayed application with a background running process are displayed in a same multi-task interface, the full-screen-displayed application is displayed in one display area in the multi-task interface, and the floating-window-displayed application is displayed in another display area in the multi-task interface. The user may select the area for displaying the floating-window-displayed application, to clear all floating-window-displayed applications in the area. That is, in this application, in a case that operation complexity is reduced, the floating-window-displayed applications are further cleared together, so that user experience is improved.

The following uses a tablet computer as an example to describe in detail the multi-task management method provided in this application.

Figure 3A:
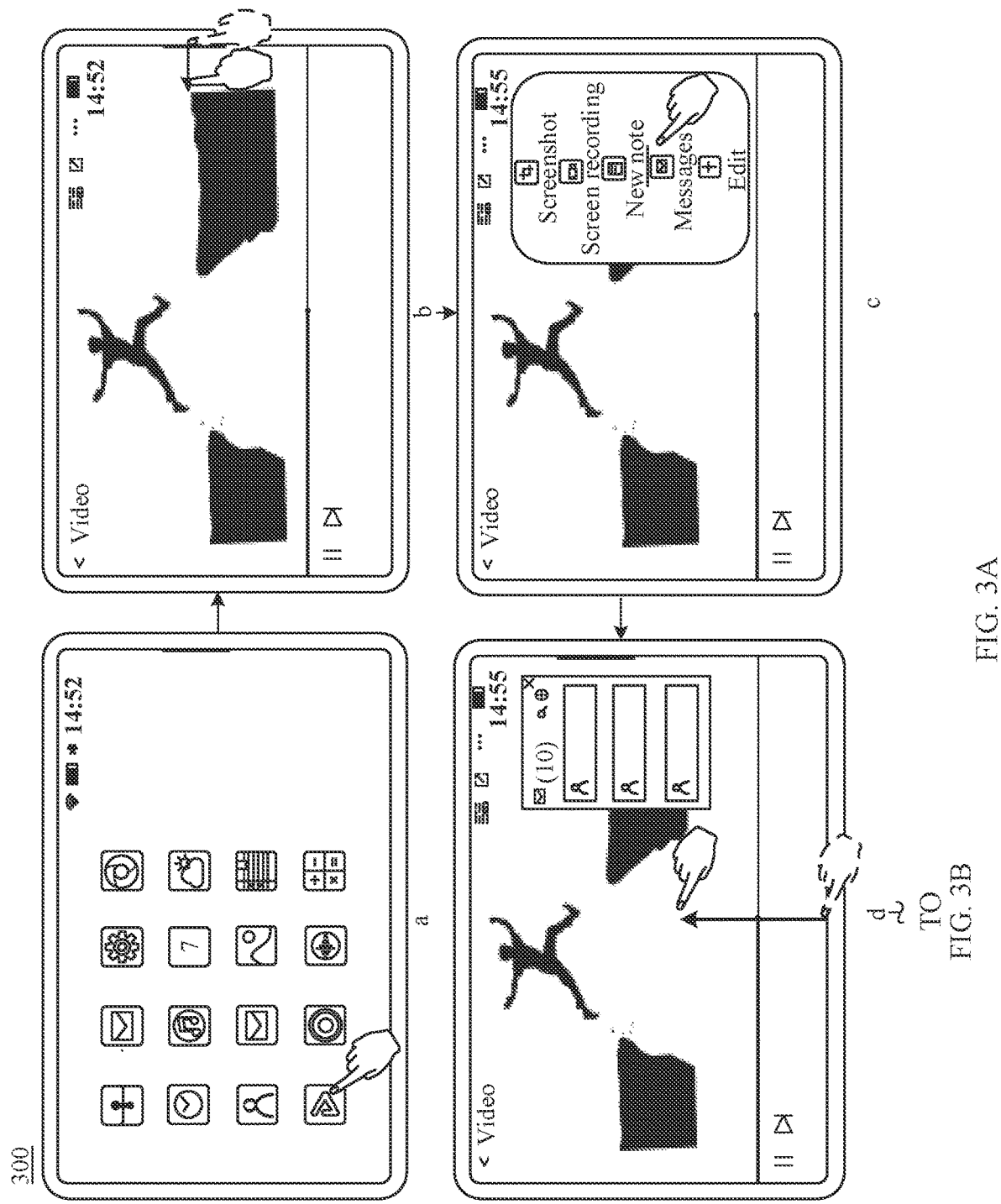

FIG. 3A and FIG. 3B show a tablet computer interface 300 of multi-task management. As shown in FIG. 3A and FIG. 3B, a user taps a "video application" icon shown in a tablet computer interface a in FIG. 3A and FIG. 3B, to open a video application. As shown in the tablet computer interface a in FIG. 3A and FIG. 3B, the interface further provides icon options of a plurality of other applications for the user. A tablet computer detects a tap operation of the user, obtains an instruction for opening the video application, enables, in response to the instruction, the video application to run in the foreground, and displays a video interface. As shown in a tablet computer interface b in FIG. 3A and FIG. 3B, the tablet computer interface b further displays a "side bar" entry (that is, a black strip on the right side of the video interface) for the user.

The user may open a side bar, for example, a "side bar" shown in a tablet computer interface c, by sliding leftward the black strip shown in the tablet computer interface b. As shown in the tablet computer interface c in FIG. 3A and FIG. 3B, the side bar further provides icons of a plurality of shortcut operations for the user, such as a "screenshot" icon, a "screen recording" icon, and a "new note" icon, and further provides an icon of a floating-window-displayed application for the user, such as a "messages" icon.

The user taps the "messages" icon shown in the tablet computer interface c, to open the SMS message application. The tablet computer detects a tap operation of the user, obtains an instruction for opening the SMS message application, enables, in response to the instruction, the SMS message application to run in the foreground, displays the SMS message application above the video interface in a form of a small screen (that is, in a form of a floating window), and displays an SMS message interface.

As shown in a tablet computer interface d in FIG. 3A and FIG. 3B, the user may slide from the bottom edge of the tablet computer interface d to the center of the tablet computer interface d with one finger, to display a multi-task window shown in a tablet computer interface e. As shown in the tablet computer interface e in FIG. 3A and FIG. 3B, the interface displays a multi-task window of full-screen-displayed applications for the user, and the multi-task window includes a file management application, a setting application, an album application, a clock application, a weather application, and a video application.

The user may view a task window of another full-screen-displayed application (not shown in the figure) by swiping rightward in the tablet computer interface e in FIG. 3A and FIG. 3B, and the user may view task windows of floating-window-displayed applications (a calculator application and an SMS message application) by swiping leftward in the tablet computer interface e.

As shown in a tablet computer interface f in FIG. 3A and FIG. 3B, the task windows of the floating-window-displayed applications are displayed in a side bar on the right side of the interface (that is, a highlighted area of the interface), and the user may view a task window of another floating-window-displayed application by sliding upward/downward the side bar (not shown in the figure). As shown in the tablet computer interface f in FIG. 3A and FIG. 3B, the user may touch and hold a blank part of the side bar until a "cross mark" (that is, a first clear button) appears in the side bar, and the user taps the "cross mark", to clear task windows of all floating-window-displayed applications. The tablet computer detects a tap operation of the user, obtains an instruction for clearing the task windows of all the floating-window-displayed applications, clears the task windows of all the floating-window-displayed applications in response to the instruction, and displays a tablet computer interface g in FIG. 3A and FIG. 3B.

Figure 4:
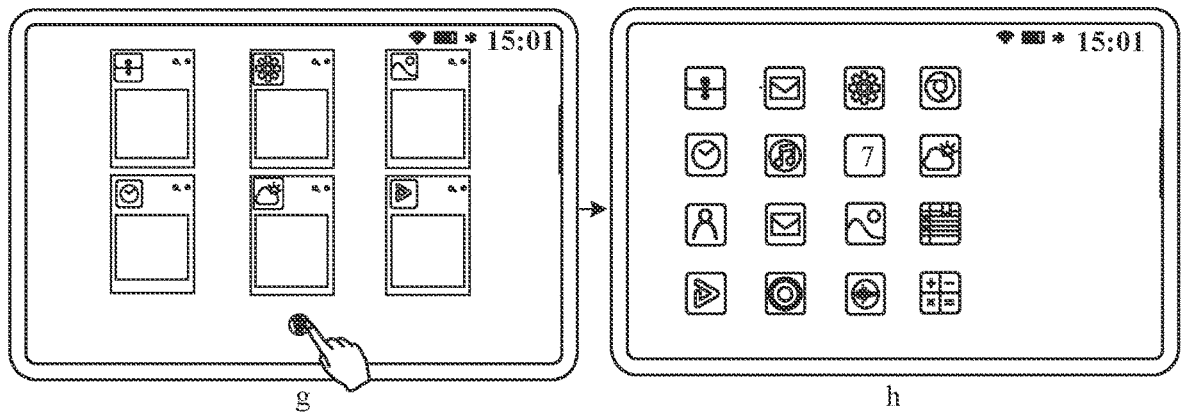
FIG. 4 is a schematic diagram of another tablet computer interface of multi-task management according to an embodiment of this application.

Optionally, FIG. 4 shows another tablet computer interface 400 of multi-task management, following the tablet computer interface g in FIG. 3A and FIG. 3B. After the task windows of all the floating-window-displayed applications are cleared, as shown in a tablet computer interface g in FIG. 4, task windows of only full-screen-displayed applications are displayed in the interface. The user may tap a "garbage can" (that is, a second clear button) at the bottom of the tablet computer interface g, to clear the task windows of all the full-screen-displayed applications displayed in the interface. The tablet computer detects a tap operation of the user, obtains an instruction for clearing the task windows of all the full-screen-displayed applications, clears the task windows of the full-screen-displayed applications in response to the instruction, and displays a tablet computer interface h in FIG. 4.

Figure 5:
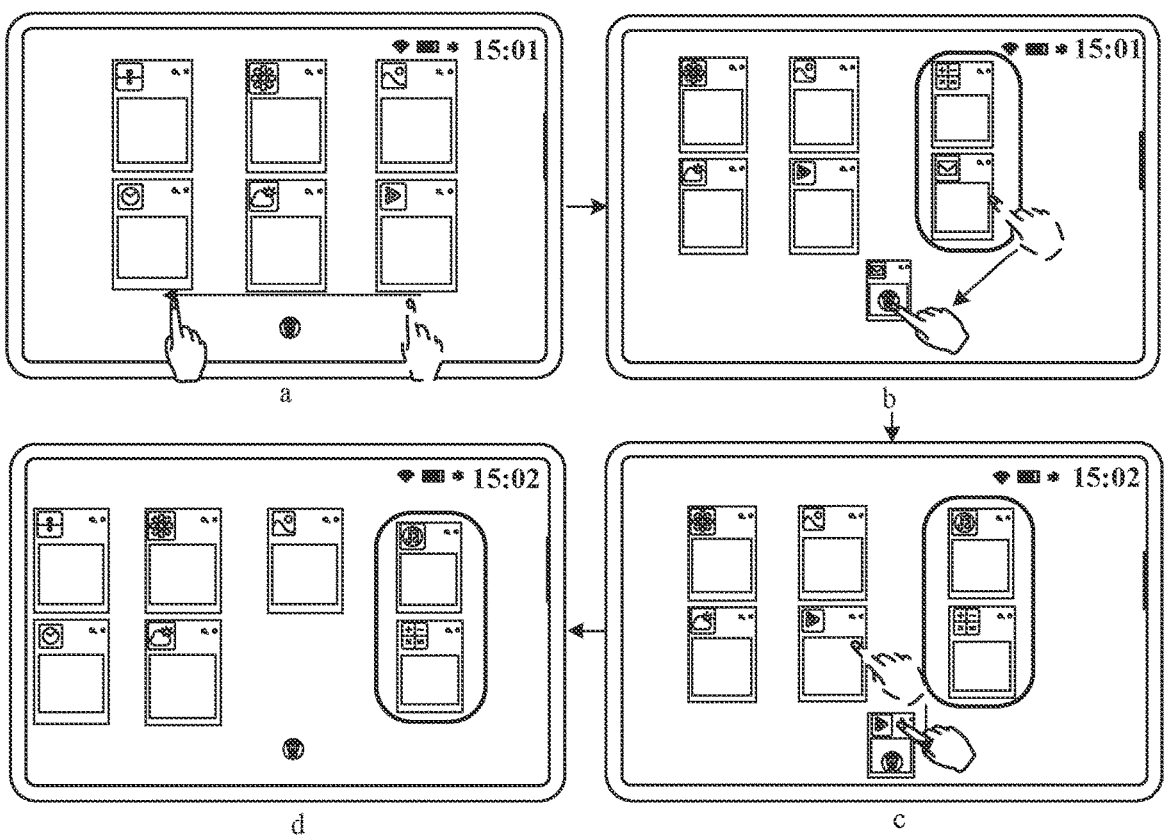
FIG. 5 is a schematic diagram of another tablet computer interface of multi-task management according to an embodiment of this application.

FIG. 5 shows another tablet computer interface 500 of multi-task management. As shown in FIG. 5, the interface 500 includes an interface a to an interface d.

Optionally, the interface a in the tablet computer interface 500 may follow the interface a to the interface d in the tablet computer interface 300 shown in FIG. 3A and FIG. 3B. For details in the interface, refer to the foregoing embodiments. To avoid repetition, details are not described herein again.

As shown in the tablet computer interface a in FIG. 5, the interface displays task windows of full-screen-displayed applications (such as a file management application, a setting application, an album application, a clock application, a weather application, and a video application) for the user. The user may view a task window of another full-screen-displayed application (not shown in the figure) by swiping rightward in the tablet computer interface a, and the user may view task windows of floating-window-displayed applications (such as a calculator application and an SMS message application) by swiping leftward in the tablet computer interface a.

As shown in the tablet computer interface b in FIG. 5, task windows of floating-window-displayed applications are displayed in a side bar of a highlighted area of the interface. The user drags a task window of the SMS message application from the side bar of the highlighted area to a "garbage can" (that is, a second clear button) at the bottom of the interface, to clear the task window of the SMS message application. The tablet computer detects a drag operation of the user, obtains an instruction for clearing the task window of the SMS message application, and clears the task window of the SMS message application in response to the instruction.

As shown in the tablet computer interface c in FIG. 5, no task window of the SMS message application exists in the side bar of the interface. The user drags a task window of a video application from a common display area (that is, an area for displaying a task window of a full-screen-displayed application) to the "garbage can" at the bottom of the interface, to clear the task window of the video application. The tablet computer detects a drag operation of the user, obtains an instruction for clearing the task window of the video application, clears the task window of the video application in response to the instruction, and displays the tablet computer interface d in FIG. 5.

Figure 6:
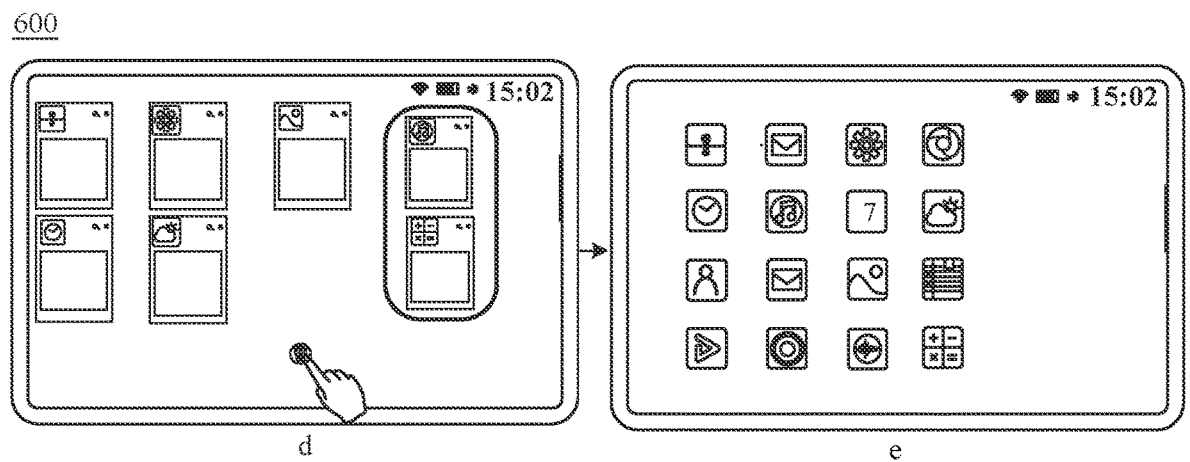
FIG. 6 is a schematic diagram of another tablet computer interface of multi-task management according to an embodiment of this application.

Optionally, FIG. 6 shows another tablet computer interface 600 of multi-task management, following the tablet computer interface d in FIG. 5. After the task window of the video application is cleared, as shown in a tablet computer interface d in FIG. 6, no task window of the video application exists in a common display area of the interface. The user may tap the "garbage can" (that is, the second clear button) at the bottom the tablet computer interface d, to clear task windows of all applications (full-screen-displayed applications include a file management application, a setting application, an album application, a clock application, and a weather application, and floating-window-displayed applications include a music application and a calculator application) displayed in the interface. The tablet computer detects a tap operation of the user, obtains an instruction for clearing the task windows of all the applications, clears the task windows of all the applications in response to the instruction, and displays a tablet computer interface e in FIG. 6.

Optionally, the terminal device may further selectively manage the foregoing applications based on a user selection.

The following uses an example in which an application is displayed in a form of an icon, to describe in detail the case in which the terminal device selectively manages the applications based on a user selection.

Figure 7:
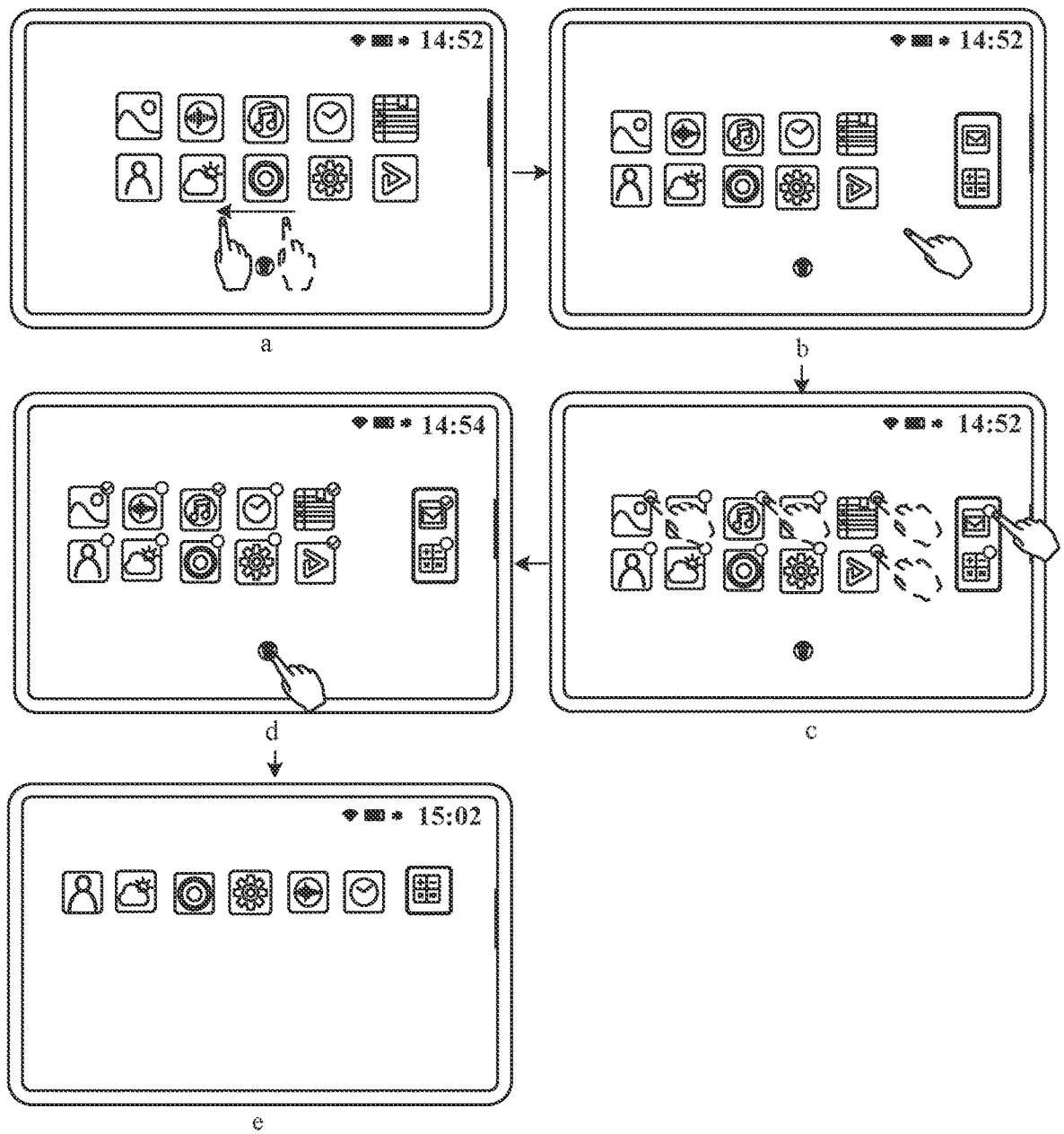
FIG. 7 is a schematic diagram of another tablet computer interface of multi-task management according to an embodiment of this application.

FIG. 7 shows a tablet computer interface 700 of multi-task management. As shown in FIG. 7, the interface 700 includes an interface a to an interface e.

Optionally, the interface a in the tablet computer interface 700 may follow the interface a to the interface d in the tablet computer interface 300 shown in FIG. 3A and FIG. 3B. For details in the interface, refer to the foregoing embodiments. To avoid repetition, details are not described herein again.

As shown in the tablet computer interface a in FIG. 7, the interface displays task icons of some full-screen-displayed applications (such as an album application, a broadcast application, a music application, and a clock application) for the user. The user may view a task icon of another full-screen-displayed application (not shown in the figure) by swiping rightward in the tablet computer interface a, and the user may view task icons of floating-window-displayed applications (such as a calculator application and an SMS message application) by swiping leftward in the tablet computer interface a.

As shown in the tablet computer interface b in FIG. 7, the floating-window-displayed applications are displayed in a side bar of a highlighted area of the interface, and the user touches and holds a blank area of the interface until option circles (that is, circles in the upper right corners of the icons, which may also be referred to as selection buttons) appear on task icons of all applications. Then, the user stops the touch and hold operation.

As shown in the tablet computer interface c in FIG. 7, a task icon of each application has an option circle. The user may separately tap option circles of a plurality of task icons, to select a plurality of applications as target applications for a next management operation. The tablet computer detects a tap operation of the user, obtains an instruction for selecting the task icons of the plurality of applications, selects the task icons of the plurality of applications in response to the instruction, and displays a check mark in an option circle of a corresponding task icon.

As shown in the tablet computer interface d in FIG. 7, the user taps a "garbage can" (that is, a second clear button) at the bottom of the tablet computer interface d, to clear task icons of selected applications (full-screen-displayed applications include an album application, a music application, a note application, and a video application, and a floating-window-displayed application is an SMS message application) in the interface. The tablet computer detects a tap operation of the user, obtains an instruction for clearing the task icons of the selected applications, and clears the task icons of the selected applications in response to the instruction.

As shown in the tablet computer interface e displayed in FIG. 7, after the selected applications are cleared, current multi-task icons include full-screen-displayed applications, such as a phone book application, a weather application, a camera application, a setting application, a broadcast application, and a clock application, and a floating-window-displayed application such as a calculator application.

It should be understood that, before background processes of the foregoing applications are cleared, the user may further perform keep-alive management on a background process of at least one application.

Figure 8:
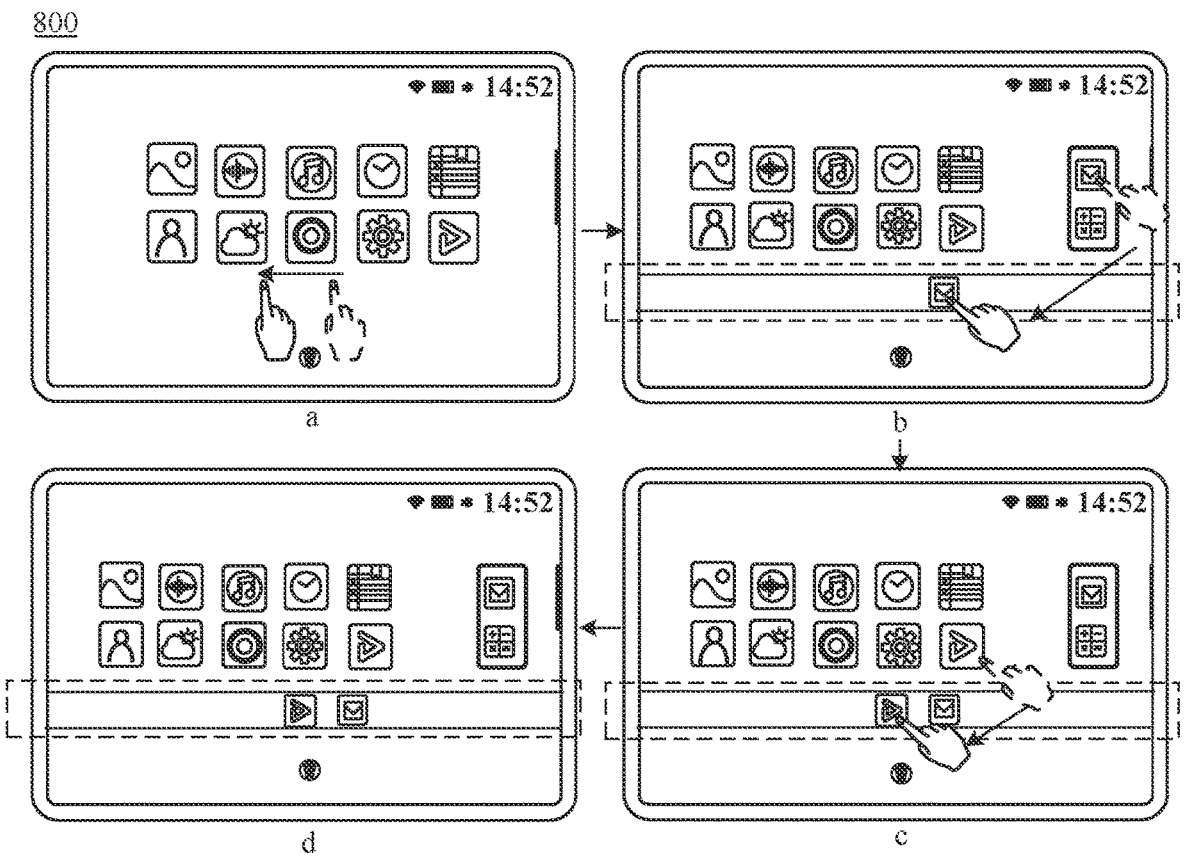
FIG. 8 is a schematic diagram of another tablet computer interface of multi-task management according to an embodiment of this application.

FIG. 8 shows a tablet computer interface 800 of multi-task management. As shown in FIG. 8, the interface 800 includes an interface a to an interface d.

Optionally, the interface a in the tablet computer interface 800 may follow the interface a to the interface d in the tablet computer interface 300. For details in the interface, refer to the foregoing embodiments. To avoid repetition, details are not described herein again.

As shown in the tablet computer interface a in FIG. 8, the interface displays multi-task icons of full-screen-displayed applications for the user. The multi-task icons include 10 applications, such as an album application, a broadcast application, a music application, a clock application, and a video application. The user may view a task icon of another full-screen-displayed application (not shown in the figure) by swiping rightward in the tablet computer interface a, and the user may view task icons of floating-window-displayed applications (such as a calculator application and an SMS message application) by swiping leftward in the tablet computer interface a.

As shown in the tablet computer interface b in FIG. 8, floating-window-displayed applications are displayed in a side bar in a highlighted area of the interface. The user drags a task icon of the SMS message application from the side bar to a keep-alive area of the interface (an area in a dashed-line box, which may also be referred to as a third area), to keep a background process of the SMS message application alive. The tablet computer detects a drag operation of the user, obtains an instruction for keeping the background process of the SMS message application alive, adds the SMS message application to a keep-alive list in response to the instruction, and displays the task icon of the SMS message application in the keep-alive area.

As shown in the tablet computer interface c in FIG. 8, task icons of full-screen-displayed applications are displayed in a common display area. The user drags a task icon of the video application from the common area to a keep-alive area of the interface, to keep a background process of the video application alive. The tablet computer detects a drag operation of the user, obtains an instruction for keeping the background process of the video application alive, adds the video application to the keep-alive list in response to the instruction, and displays the task icon of the video application in the keep-alive area. As shown in the tablet computer interface d in FIG. 8, the keep-alive area displays the task icon of the SMS message application and the task icon of the video application.

Figure 9:
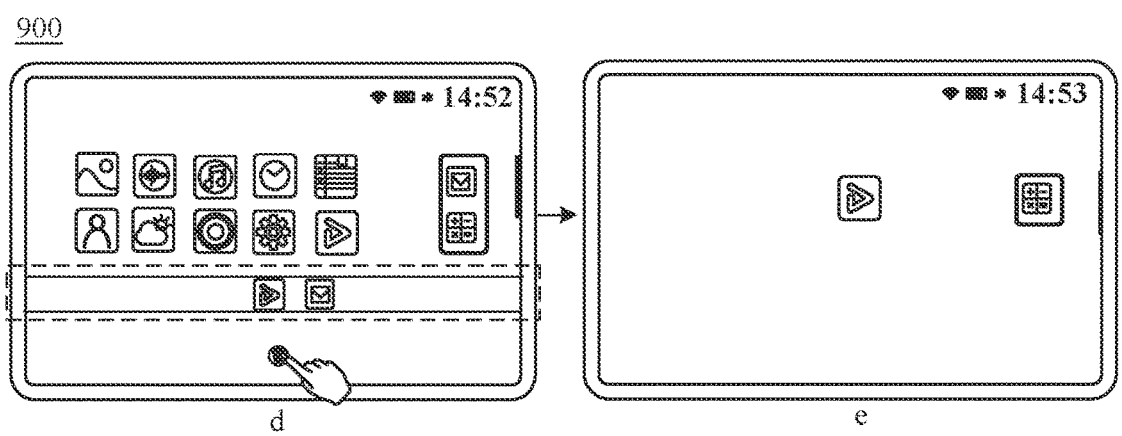
FIG. 9 is a schematic diagram of another tablet computer interface of multi-task management according to an embodiment of this application.

Optionally, FIG. 9 shows another tablet computer interface 900 of multi-task management, following the tablet computer interface d in FIG. 8. As shown in the tablet computer interface d in FIG. 9, the user may clear task icons of all non-keep-alive applications, that is, clear background processes of all the applications, by tapping a "garbage can" (that is, a second clear button) at the bottom of the interface. The tablet computer detects a tap operation of the user, obtains an instruction for clearing the background processes of the non-keep-alive applications, clears the background processes of the non-keep-alive applications in response to the instruction, and deletes the icons of the applications.

As shown in the tablet computer interface e in FIG. 9, the current interface displays only a task icon of the keep-alive full-screen-displayed video application and a task icon of the floating-window-displayed calculator application.

Optionally, the user may further adjust a management function based on a usage habit, so that the terminal device manages a plurality of tasks based on an adjusted management function.

In a first possible implementation, the user disables a partition display function, that is, disables a function of displaying a multi-task window or a multi-task icon of a floating-window-displayed application in a side bar.

Figure 10:
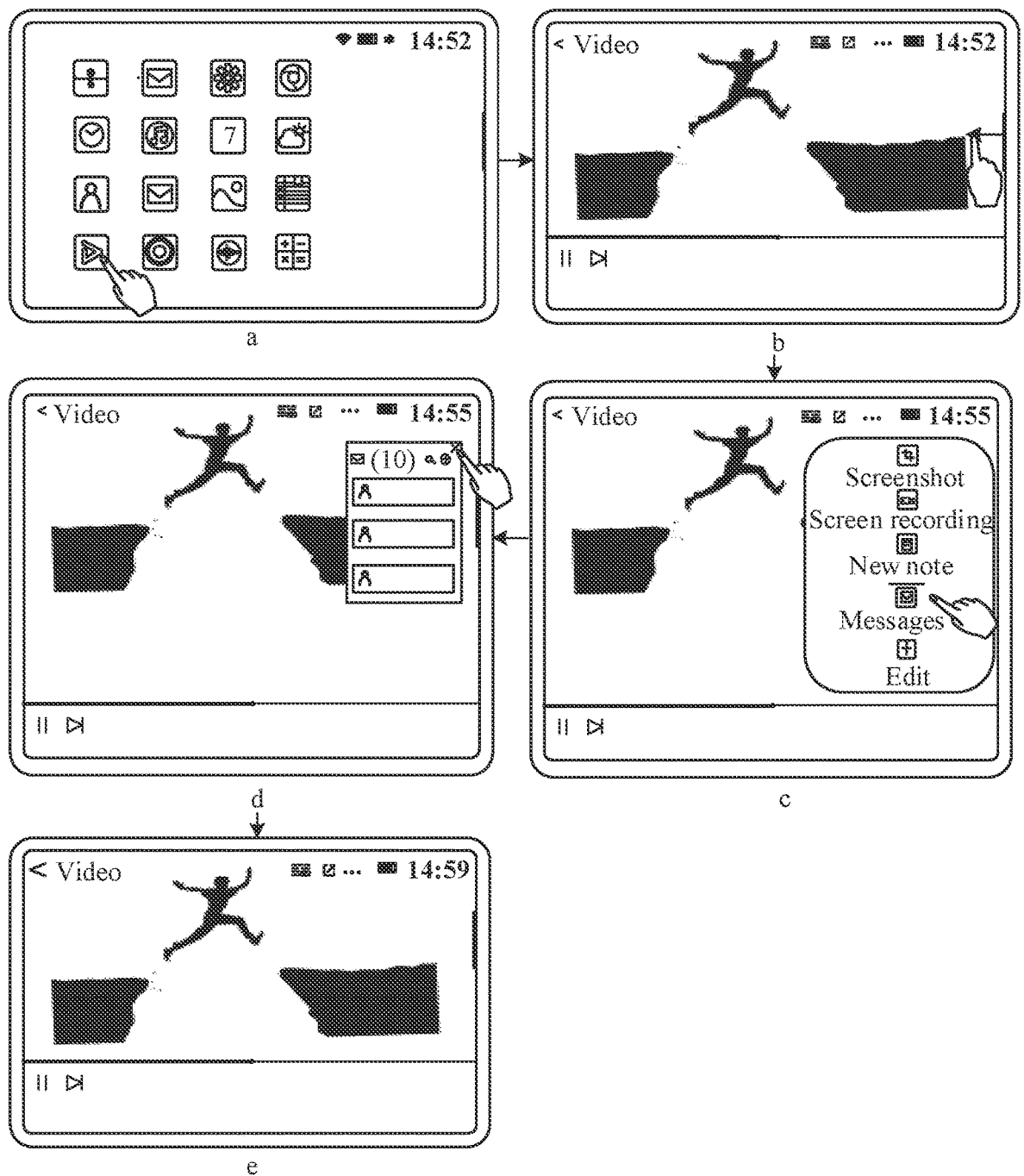
FIG. 10 is a schematic diagram of another tablet computer interface of multi-task management according to an embodiment of this application.

FIG. 10 shows a tablet computer interface 1000 of multi-task management. As shown in FIG. 10, the user taps a "video application" icon shown in a tablet computer interface a in FIG. 10, to open a video application. As shown in the tablet computer interface a in FIG. 10, the interface further provides icon options of a plurality of other applications for the user. The tablet computer detects a tap operation of the user, obtains an instruction for opening the video application, enables, in response to the instruction, the video application to run in the foreground, and displays a video interface.

As shown in a tablet computer interface b in FIG. 10, the tablet computer interface b further displays a "side bar" entry (that is, a black strip on the right side of the video interface) for the user. The user may open a side bar by sliding leftward the black strip shown in the tablet computer interface b.

As shown in a "side bar" shown in a tablet computer interface c in FIG. 10, the side bar further provides icons of a plurality of shortcut operations for the user, such as a "screenshot" icon, a "screen recording" icon, and a "new note" icon, and further provides an icon of a floating-window-displayed application for the user, for example, a "messages" icon. The user taps the "messages" icon shown in the tablet computer interface c, to open an SMS message application. The tablet computer detects a tap operation of the user, obtains an instruction for opening the SMS message application, enables, in response to the instruction, the SMS message application to run in the foreground, displays the SMS message application above the video interface in a form of a small screen (that is, in a form of a floating window), and displays an SMS message interface.

As shown in a tablet computer interface d in FIG. 10, the user taps a cross mark in the upper right corner of the floating window of the SMS message application shown in the tablet computer interface d in FIG. 10, to close the SMS message application (and clear a background process of the application). The tablet computer detects a tap operation of the user, obtains an instruction for closing the SMS message application, closes the SMS message application in response to the instruction, clears the SMS message application in the background, and displays a video interface, as shown in a tablet computer interface e in FIG. 10.

Figure 11:
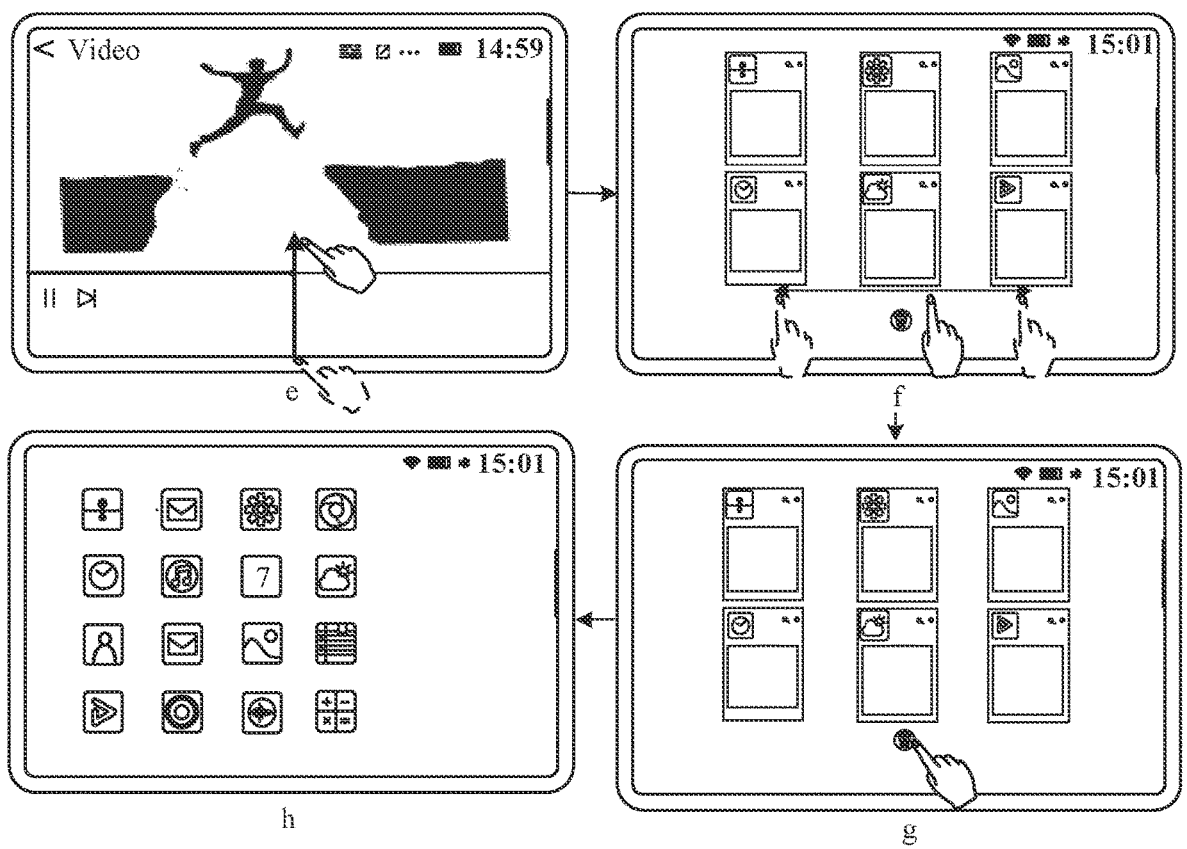
FIG. 11 is a schematic diagram of another tablet computer interface of multi-task management according to an embodiment of this application.

Optionally, FIG. 11 shows another tablet computer interface 1100 of multi-task management, following the tablet computer interface e in FIG. 10. As shown in a computer interface e in FIG. 11, the user may slide from a bottom edge of the tablet computer interface e to a center of the tablet computer interface e with one finger, to display a multi-task window of full-screen-displayed applications. The tablet computer detects a tap operation of the user, obtains an instruction for displaying the multi-task window of the full-screen-displayed applications, and displays the multi-task window of the full-screen-displayed applications in response to the instruction.

As shown in a computer interface f in FIG. 11, the multi-task window includes a file management application, a setting application, a clock application, a video application, a weather application, and an album application. The user may swipe left and right to view a task window of another full-screen-displayed application.

As shown in a tablet computer interface g in FIG. 11, the user taps a "garbage can" (that is, a second clear button) at the bottom of the tablet computer interface g, to clear task windows of all full-screen-displayed applications displayed in the interface. The tablet computer detects a tap operation of the user, obtains an instruction for clearing background processes of all the full-screen-displayed applications, clears the task windows of all the applications in response to the instruction, and displays a tablet computer interface h in FIG. 11.

Figure 12:
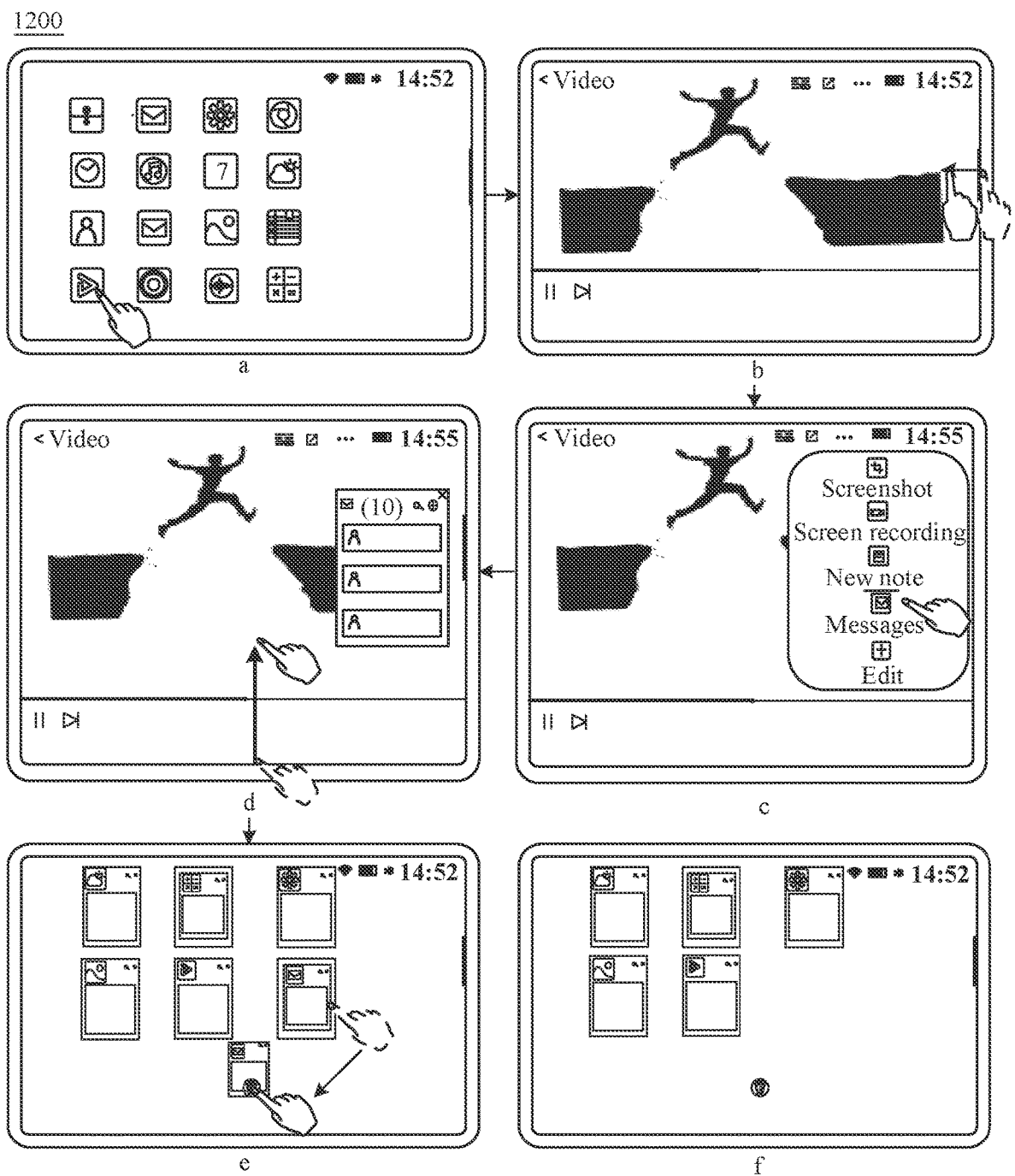
FIG. 12 is a schematic diagram of another tablet computer interface of multi-task management according to an embodiment of this application.

FIG. 12 shows a tablet computer interface 1200 of multi-task management. As shown in FIG. 12, the user taps a "video application" icon shown in a tablet computer interface a in FIG. 12, to open a video application. As shown in the tablet computer interface a, the interface further provides icon options of a plurality of other applications for the user. The tablet computer detects a tap operation of the user, obtains an instruction for opening the video application, enables, in response to the instruction, the video application to run in the foreground, and displays a video interface.

As shown in a tablet computer interface b in FIG. 12, the tablet computer interface b further displays a "side bar" entry (that is, a black strip on the right side of the video interface) for the user. The user may open a side bar by sliding leftward the black strip shown in the tablet computer interface b.

As shown in a "side bar" shown in a tablet computer interface c in FIG. 12, the side bar further provides icons of a plurality of shortcut operations for the user, such as a "screenshot" icon, a "screen recording" icon, and a "new note" icon, and further provides an icon of a floating-window-displayed application for the user, such as a "messages" icon. The user taps the "messages" icon shown in the tablet computer interface c, to open an SMS message application. The tablet computer detects a tap operation of the user, obtains an instruction for opening the SMS message application, enables, in response to the instruction, the SMS message application to run in the foreground, displays the SMS message application above the video interface in a form of a small screen (that is, in a form of a floating window), and displays an SMS message interface.

As shown in a tablet computer interface d in FIG. 12, the user may slide from a bottom edge of the tablet computer interface d to a center of the tablet computer interface d with one finger, to display a multi-task window of applications. The tablet computer detects a tap operation of the user, obtains an instruction for displaying the multi-task window of the applications, and displays a multi-task window interface of the applications in response to the instruction. As shown in a tablet computer interface e, the multi-task window provided by the interface for the user includes full-screen-displayed applications and floating-window-displayed applications (applications with two boxes). The full-screen-displayed applications include an album application, a setting application, a weather application, and a video application, and the floating-window-displayed applications include a calculator application and an SMS message application.

As shown in the tablet computer interface e in FIG. 12, the user drags a task window of the SMS message application to a "garbage can" (that is, a second clear button) at the bottom of the interface, to clear a background process of the SMS message application. The tablet computer detects a drag operation of the user, obtains an instruction for clearing the background process of the SMS message application, clears the background process of the SMS message application in response to the instruction, deletes the task window of the SMS message application in the tablet computer interface e, and displays a task window interface of remaining applications, as shown in a tablet computer interface f in FIG. 12.

Figure 13:
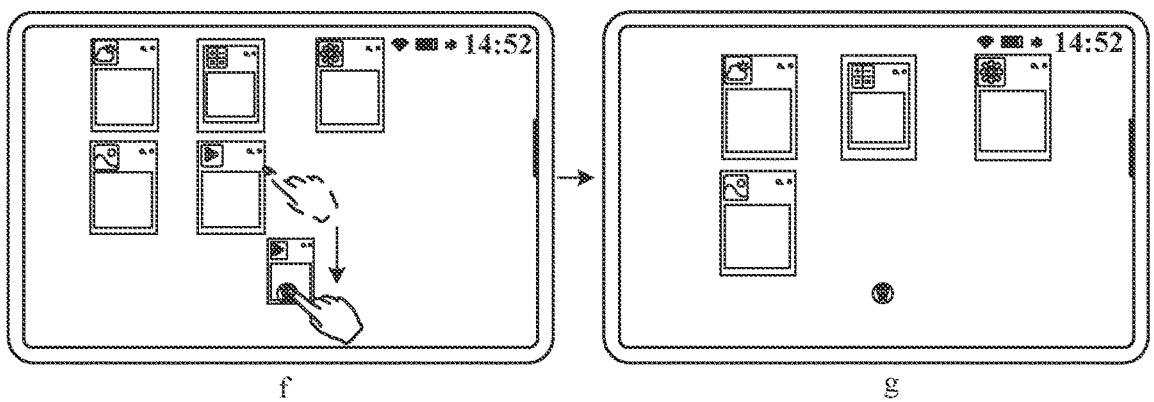
FIG. 13 is a schematic diagram of another tablet computer interface of multi-task management according to an embodiment of this application.

Optionally, FIG. 13 shows another tablet computer interface 1300 of multi-task management, following the tablet computer interface f in FIG. 12. As shown in a tablet computer interface f in FIG. 13, no task window of the SMS message application exists in the interface, and the user drags the task window of the video application to the "garbage can" (that is, the second clear button) at the bottom of the interface, to clear a background process of the video application. The tablet computer detects a drag operation of the user, obtains an instruction for clearing the background process of the video application, clears the background process of the video application in response to the instruction, and deletes the task window of the video application in the tablet computer interface f. As shown in a tablet computer interface g in FIG. 13, no task window of the video application exists in a current interface.

Figure 14:
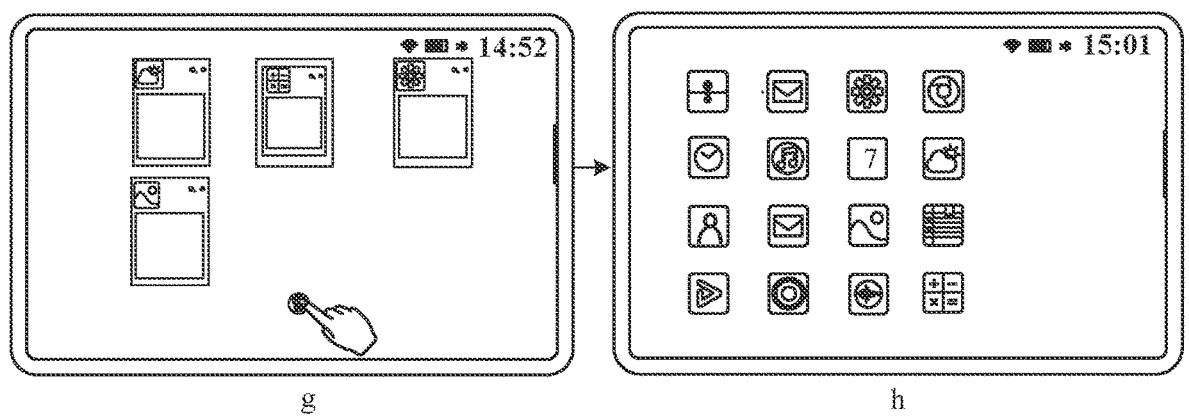
FIG. 14 is a schematic diagram of another tablet computer interface of multi-task management according to an embodiment of this application.

Optionally, FIG. 14 shows another tablet computer interface 1400 of multi-task management, following the tablet computer interface g in FIG. 13. As shown in a tablet computer interface g in FIG. 14, no task window of the video application exists in the interface. The user may tap the "garbage can" (that is, the second clear button) at the bottom of the interface, to clear background processes of all applications (full-screen-displayed applications include a weather application, a setting application, and an album application, and a floating-window-displayed application includes a calculator application) displayed in the tablet computer interface g. The tablet computer detects a tap operation of the user, obtains an instruction for clearing the background processes of all the applications, clears the background processes of all the applications in response to the instruction, deletes task windows of all the applications, and returns to a tablet computer interface h.

In a second possible implementation, the user may set floating-window-displayed applications displayed in the side bar of the highlighted area to applications of a specific type, such as an office type or a game type, without disabling the foregoing partition function.

Figure 15:
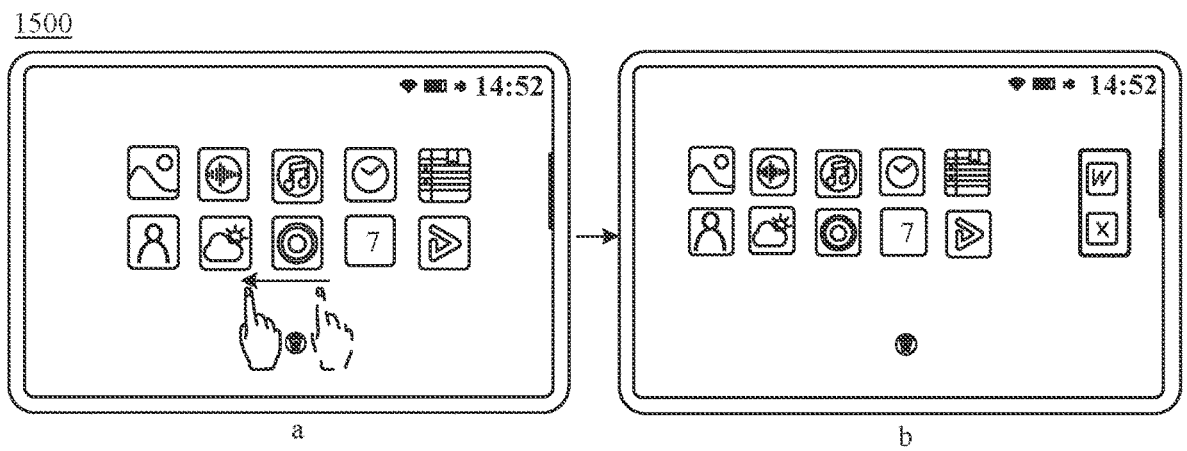
FIG. 15 is a schematic diagram of another tablet computer interface of multi-task management according to an embodiment of this application.

FIG. 15 shows a tablet computer interface 1500 of multi-task management. As shown in FIG. 15, the interface 1500 includes an interface a and an interface d.

Optionally, the interface a in the tablet computer interface 1500 may follow the interface a to the interface d in the tablet computer interface 300. For details in the interface, refer to the foregoing embodiments. To avoid repetition, details are not described herein again.

As shown in the tablet computer interface a shown in FIG. 15, the interface displays a multi-task icon of full-screen-displayed applications for the user. The multi-task icon includes 10 full-screen-displayed applications, such as an album application, a broadcast application, a music application, a clock application, and a video application. The user may view a task icon of another full-screen-displayed application (not shown in the figure) by swiping rightward in the tablet computer interface a, and the user may view a task icon of an office application (for example, Microsoft® Word® and Microsoft® Excel®) by swiping leftward in the tablet computer interface a.

As shown in the tablet computer interface b shown in FIG. 15, task icons of office applications are displayed in a side bar in a highlighted area of the interface. The user may perform different management on the office applications and another application through the method shown in the foregoing embodiments. To avoid repetition, details are not described herein again.

It should be understood that the user may directly slide from the edge of the display of the terminal device to the center of the display of the terminal device with two fingers, or slide from the bottom edge of the display of the terminal device to the center of the display of the terminal device with one finger, to enter the multi-task window interface or the multi-task icon interface in the foregoing embodiments, and manage applications based on the multi-task window interface or the multi-task icon interface.

It should be understood that the instruction of the user may also be referred to as an operation of the user. For example, the first instruction may be referred to as a first operation, the second instruction may be referred to as a second operation, and the third instruction may be referred to as a third operation. Operations of the user may specifically include a touch operation, a drag operation, a gesture triggering operation, a voice wakeup operation, a tap operation, and the like. This is not limited in this embodiment of this application. Operations corresponding to different instructions may be the same, or may be different. Different operations may be corresponding to a same instruction, or may be corresponding to different instructions. For example, the user may open the foregoing application A through the tap operation, or may open the foregoing application A through the voice wakeup operation. This is not limited in this embodiment of this application.

It should be understood that the foregoing embodiments may also be mutually coupled. This is not limited in this application. In addition, sequence numbers of the foregoing processes do not mean a sequence of execution. The sequence of execution of the processes should be determined according to functions and internal logic of the processes, and should not constitute any limitation on an implementation process of embodiments of this application.

In the foregoing embodiments provided in this application, the method provided in embodiments of this application is described from a perspective of using a terminal device as an execution body. To implement functions in the foregoing methods provided in embodiments of this application, the terminal device may include a hardware structure and/or a software module, and implement the foregoing functions in a form of the hardware structure, the software module, or a combination of the hardware structure and the software module. Whether a function in the foregoing functions is executed in a manner of the hardware structure, the software module, or a combination of the hardware structure and the software module depends on specific applications and design constraints of the technical solutions.

Figure 16:
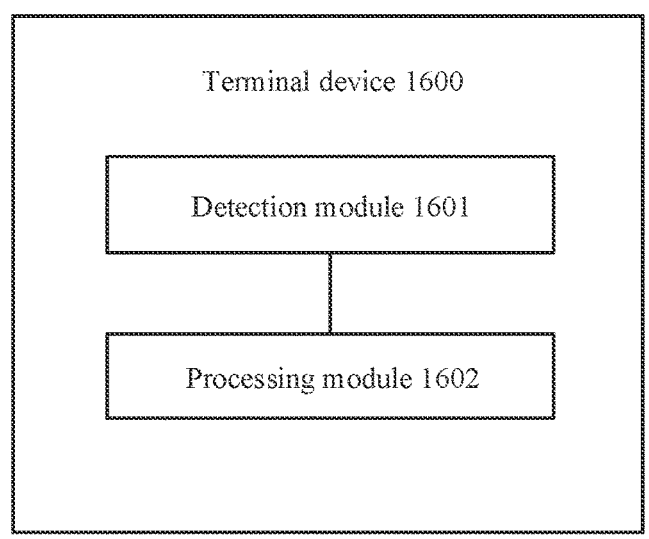
FIG. 16 is a schematic block diagram of a terminal device according to an embodiment of this application.
Figure 17:
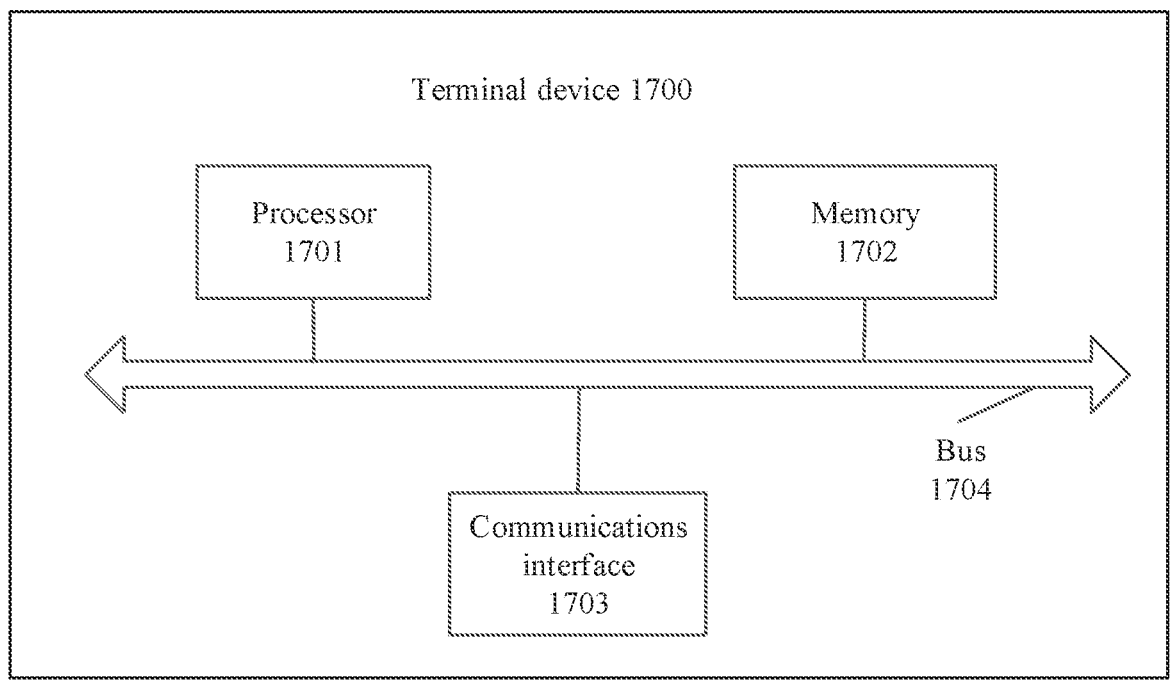
FIG. 17 is a schematic block diagram of another terminal device according to an embodiment of this application.

With reference to FIG. 16 and FIG. 17, the following describes the terminal device provided in embodiments of this application in detail.

FIG. 16 shows a terminal device 1600 provided in an embodiment of this application. The terminal device 1600 includes a detection module 1601 and a processing module 1602.

The detection module 1601 is configured to detect a first instruction of a user, where the first instruction is used to open a multi-task interface, the multi-task interface is used to display a plurality of applications with background running processes, and the plurality of applications include a full-screen-displayed application and a floating-window-displayed application. The processing module 1602 is configured to display the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area. The detection module 1601 is configured to detect a second instruction of the user, where the second instruction is used to select the second area. The processing module 1602 is configured to: display a first clear button in the second area in response to the second instruction; and detect a third instruction of the user for the first clear button, and end a background running process of the floating-window-displayed application in the second area in response to the third instruction.

Optionally, a second clear button is displayed in the multi-task interface. The detection module 1601 is configured to detect a fourth instruction of the user, where the fourth instruction is used to select at least one application in the plurality of applications. The processing module 1602 is configured to display a selection button of each application in the plurality of applications on a task window or a task icon of each application in response to the fourth instruction. The detection module 1601 is configured to detect at least two fifth instructions of the user for at least two selection buttons, where the fifth instructions are used to select a task window or a task icon of at least one full-screen-displayed application in the first area and a task window or a task icon of at least one floating-window-displayed application in the second area. The processing module 1602 is configured to: select task windows or task icons of applications corresponding to the at least two selection buttons in response to the at least two fifth instructions; and detect a sixth instruction of the user for the second clear button, and end background running processes of the applications corresponding to the at least two selection buttons in response to the sixth instruction.

Optionally, the processing module 1602 is configured to: detect a leftward/rightward swipe instruction of the user in the first area, and display a task window or a task icon of another full-screen-displayed application with a background running process in response to the leftward/rightward swipe instruction; and detect an upward/downward swipe instruction of the user in the second area, and display a task window or a task icon of another floating displayed application with a background running process in response to the upward/downward swipe instruction.

Optionally, a second clear button is displayed in the multi-task interface. The detection module 1601 is configured to detect a first drag instruction of the user for a task window or a task icon of a first application in the plurality of applications, where the first drag instruction is used to drag the task window or the task icon of the first application to the second clear button. The processing module 1602 is configured to end a background running process of the first application in response to the first drag instruction.

Optionally, the multi-task interface further includes a third area, and the third area is used to display a task window or a task icon of at least one keep-alive application. The detection module 1601 is configured to detect a second drag instruction of the user for a task window or a task icon of a second application in the plurality of applications, where the second drag instruction is used to drag the task window or the task icon of the second application to the third area. The processing module 1602 is configured to move the task window or the task icon of the second application from the second area to the third area in response to the second drag instruction.

Optionally, the second clear button is displayed in the multi-task interface. The processing module 1602 is configured to: detect a seventh instruction of the user for the second clear button, and end a background running process of the full-screen-displayed application in the first area in response to the seventh instruction.

It should be understood that the terminal device 1600 herein is embodied in a form of function modules. The term "module" herein may refer to an application-specific integrated circuit (ASIC), an electronic circuit, a processor (such as a shared processor, a dedicated processor, or a packet processor) that is configured to execute one or more software or firmware programs and a memory, a combinational logic circuit, and/or another suitable component that supports the described function. In an optional example, a person skilled in the art may understand that the terminal device 1600 may be specifically the terminal device in the foregoing embodiments, or a function of the terminal device in the foregoing embodiments may be integrated into the terminal device 1600. The terminal device 1600 may be configured to perform processes and/or steps corresponding to the terminal device in the foregoing method embodiments. To avoid repetition, details are not described herein again.

The terminal device 1600 has a function of implementing corresponding steps performed by the terminal device in the foregoing method. The function may be implemented through hardware, or may be implemented by executing corresponding software through hardware. The hardware or software includes one or more modules corresponding to the function.

In an embodiment of this application, the terminal device 1600 in FIG. 16 may alternatively be a chip or a chip system, for example, a system on a chip (SoC).

FIG. 17 shows another terminal device 1700 according to an embodiment of this application. The terminal device 1700 includes a processor 1701, a memory 1702, a communications interface 1703, and a bus 1704. The memory 1702 is configured to store instructions, and the processor 1701 is configured to execute the instructions stored in the memory 1702. The processor 1701, the memory 1702, and the communications interface 1703 implement a communication connection with each other through the bus 1704.

The processor 1701 is configured to: detect a first instruction of a user, where the first instruction is used to open a multi-task interface, the multi-task interface is used to display a plurality of applications with background running processes, and the plurality of applications include a full-screen-displayed application and a floating-window-displayed application; display the multi-task interface in response to the first instruction, where the multi-task interface includes a first area and a second area, a task window or a task icon of the full-screen-displayed application in the plurality of applications is displayed in the first area, and a task window or a task icon of the floating-window-displayed application in the plurality of applications is displayed in the second area; detect a second instruction of the user, where the second instruction is used to select the second area; display a first clear button in the second area in response to the second instruction; and detect a third instruction of the user for the first clear button, and end a background running process of the floating-window-displayed application in the second area in response to the third instruction.

Optionally, a second clear button is displayed in the multi-task interface. The processor 1701 is configured to: detect a fourth instruction of the user, where the fourth instruction is used to select at least one application in the plurality of applications; display a selection button of each application in the plurality of applications on a task window or a task icon of each application in response to the fourth instruction; detect at least two fifth instructions of the user for at least two selection buttons, where the fifth instructions are used to select a task window or a task icon of at least one full-screen-displayed application in the first area and a task window or a task icon of at least one floating-window-displayed application in the second area; select task windows or task icons of applications corresponding to the at least two selection buttons in response to the at least two fifth instructions; and detect a sixth instruction of the user for the second clear button, and end background running processes of the applications corresponding to the at least two selection buttons in response to the sixth instruction.

Optionally, the processor 1701 is configured to: detect a leftward/rightward swipe instruction of the user in the first area, and display a task window or a task icon of another full-screen-displayed application with a background running process in response to the leftward/rightward swipe instruction; and detect an upward/downward swipe instruction of the user in the second area, and display a task window or a task icon of another floating displayed application with a background running process in response to the upward/downward swipe instruction.

Optionally, a second clear button is displayed in the multi-task interface. The processor 1701 is configured to: detect a first drag instruction of the user for a task window or a task icon of a first application in the plurality of applications, where the first drag instruction is used to drag the task window or the task icon of the first application to the second clear button; and end a background running process of the first application in response to the first drag instruction.

Optionally, the multi-task interface further includes a third area, and the third area is used to display a task window or a task icon of at least one keep-alive application. The processor 1701 is configured to: detect a second drag instruction of the user for a task window or a task icon of a second application in the plurality of applications, where the second drag instruction is used to drag the task window or the task icon of the second application to the third area; and move the task window or the task icon of the second application from the second area to the third area in response to the second drag instruction.

Optionally, the second clear button is displayed in the multi-task interface. The processor 1701 is configured to: detect a seventh instruction of the user for the second clear button, and end a background running process of the full-screen-displayed application in the first area in response to the seventh instruction.

It should be understood that the terminal device 1700 may be specifically the terminal device in the foregoing embodiments, or a function of the terminal device in the foregoing embodiments may be integrated into the terminal device 1700. The terminal device 1700 may be configured to perform steps and/or procedures corresponding to the terminal device in the foregoing method embodiments. Optionally, the memory 1702 may include a read-only memory and a random access memory, and may provide instructions and data for the processor. A part of the memory may further include a non-volatile random access memory. For example, the memory may further store information about a device type. The processor 1701 may be configured to execute the instructions stored in the memory, and when the processor executes the instructions, the processor can perform steps and/or procedures corresponding to the terminal device in the foregoing method embodiments.

It should be understood that, in embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

In an implementation process, the steps in the foregoing methods may be completed through an integrated logic circuit of hardware in the processor or an instruction in a form of software. The steps of the methods disclosed with reference to embodiments of this application may be directly executed and completed through a hardware processor, or may be executed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor executes the instructions in the memory, and completes the steps in the foregoing methods with reference to hardware of the processor. To avoid repetition, details are not described herein again.

A person of ordinary skill in the art may be aware that, with reference to the examples described in embodiments disclosed herein, units and algorithm steps may be implemented by electronic hardware or a combination of computer software and electronic hardware. Whether the functions are executed by hardware or software depends on specific applications and design constraints of the technical solutions. A person skilled in the art may use different methods to implement the described functions for each specific application, but this implementation should not be considered to be beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in embodiments of this application may be integrated into one processing unit, or each unit may exist alone physically, or two or more units may be integrated into one unit.

The function may be stored in a computer-readable storage medium if the function is implemented in a form of a software functional unit and sold or used as an independent product. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A multi-task management method, comprising:
    detecting, by a terminal device, a first instruction of a user, wherein the first instruction is used to open a multi-task interface, the multi-task interface is used to display a plurality of applications with background running processes running on the terminal device, and the plurality of applications comprises a full-screen-displayed application running on the terminal device and a floating-window-displayed application running on the terminal device;
    displaying, by the terminal device, the multi-task interface based on detecting the first instruction, wherein the multi-task interface comprises a first area, a second area, and a third area, wherein a task window or a task icon of the full-screen-displayed application and representations of other full-screen-displayed applications in the plurality of applications is displayed in the first area, a task window or a task icon of the floating-window-displayed application and representations of other floating-window-displayed applications in the plurality of applications is displayed in the second area, and the third area is used to display a task window or a task icon of at least one keep-alive application;
    detecting, by the terminal device, a second instruction of the user, wherein the second instruction is used to select the second area;
    displaying, by the terminal device, a first clear button in the second area based on detecting the second instruction; and
    detecting, by the terminal device, a third instruction of the user for the first clear button, and ending a background running process of the floating-window-displayed application in the second area based on detecting the third instruction;

wherein a second clear button is displayed in the multi-task interface;

wherein before the detecting, by the terminal device, the second instruction of the user, the method further comprises:
  detecting, by the terminal device, a fourth instruction of the user, wherein the fourth instruction is used to select at least one application in the plurality of applications;
  displaying, by the terminal device, a selection button of each application in the plurality of applications on a task window or a task icon of each application based on detecting the fourth instruction;
  detecting, by the terminal device, at least two fifth instructions of the user for at least two selection buttons, wherein the fifth instructions are used to select a task window or a task icon of at least one full-screen-displayed application in the first area and a task window or a task icon of at least one floating-window-displayed application in the second area;
  selecting, by the terminal device, task windows or task icons of applications corresponding to the at least two selection buttons based on detecting the at least two fifth instructions; and
  detecting, by the terminal device, a sixth instruction of the user for the second clear button, and ending background running processes of the applications corresponding to the at least two selection buttons based on detecting the sixth instruction; and wherein before the detecting, by the terminal device, the second instruction of the user, the method further comprises:
  detecting, by the terminal device, a first drag instruction of the user for a task window or a task icon of a first application in the plurality of applications, wherein the first drag instruction is used to drag the task window or the task icon of the first application to the third area; and
  moving, by the terminal device, the task window or the task icon of the first application from the second area to the third area based on detecting the first drag instruction.

2. The method according to claim 1, wherein before the detecting, by the terminal device, the at least two fifth instructions of the user for at least two selection buttons, the method further comprises:
  detecting, by the terminal device, a leftward/rightward swipe instruction of the user in the first area, and displaying a task window or a task icon of another full-screen-displayed application with a background running process based on detecting the leftward/rightward swipe instruction; and
  detecting, by the terminal device, an upward/downward swipe instruction of the user in the second area, and displaying a task window or a task icon of another floating-window-displayed application with a background running process based on detecting the upward/downward swipe instruction.

3. The method according to claim 1, wherein before the detecting, by the terminal device, the second instruction of the user, the method further comprises:
  detecting, by the terminal device, a second drag instruction of the user for a task window or a task icon of a second application in the plurality of applications, wherein the second drag instruction is used to drag the task window or the task icon of the second application to the second clear button; and
  ending, by the terminal device, a background running process of the second application based on detecting the second drag instruction.

4. The method according to claim 1, wherein after the ending the background running process of the floating-window-displayed application in the second area based on detecting the third instruction, the method further comprises:
  detecting, by the terminal device, a seventh instruction of the user for the second clear button, and ending a background running process of the full-screen-displayed application in the first area based on detecting the seventh instruction.

5. The method according to claim 1, wherein based on detecting the first instruction, the multi-task interface is displayed with the second clear button.

6. A terminal device, comprising:
  a processor; and
  a memory coupled to the processor that stores computer-executable instructions, and the processor is configured to execute the computer-executable instructions stored in the memory, so that the processor performs:
    detecting a first instruction of a user, wherein the first instruction is used to open a multi-task interface, the multi-task interface is used to display a plurality of applications with background running processes running on the terminal device, and the plurality of applications comprises a full-screen-displayed application running on the terminal device and a floating-window-displayed application running on the terminal device;
    displaying the multi-task interface based on detecting the first instruction, wherein the multi-task interface comprises a first area, a second area, and a third area, wherein a task window or a task icon of the full-screen-displayed application in the plurality of applications is displayed in the first area, a task window or a task icon of the floating-window-displayed application in the plurality of applications is displayed in the second area, wherein a second clear button is displayed in the multi-task interface, and the third area is used to display a task window or a task icon of at least one keep-alive application;
    detecting a fourth instruction of the user, wherein the fourth instruction is used to select at least one application in the plurality of applications;
    displaying a selection button of each application in the plurality of applications on a task window or a task icon of each application based on detecting the fourth instruction;
    detecting at least two fifth instructions of the user for at least two selection buttons, wherein the fifth instructions are used to select a task window or a task icon of at least one full-screen-displayed application in the first area and a task window or a task icon of at least one floating-window-displayed application in the second area;
    selecting task windows or task icons of applications corresponding to the at least two selection buttons based on detecting the at least two fifth instructions;
    detecting a sixth instruction of the user for the second clear button, and end background running processes of the applications corresponding to the at least two selection buttons based on detecting the sixth instruction;
    detecting a second instruction of the user, wherein the second instruction is used to select the second area;

displaying a first clear button in the second area based on detecting the second instruction; and detecting a third instruction of the user for the first clear button, and ending a background running process of the floating-window-displayed application in the second area based on detecting the third instruction;

wherein before the detecting the second instruction of the user, the processor executing the computer-executable instructions further causes the processor to:

detect a first drag instruction of the user for a task window or a task icon of a first application in the plurality of applications, wherein the first drag instruction is used to drag the task window or the task icon of the first application to the third area; and move the task window or the task icon of the first application from the second area to the third area based on detecting the first drag instruction.

7. The terminal device according to claim 6, wherein the processor executing the computer-executable instructions further causes the processor to:

detect a leftward/rightward swipe instruction of the user in the first area, and display a task window or a task icon of another full-screen-displayed application with a background running process based on detecting the leftward/rightward swipe instruction; and detect an upward/downward swipe instruction of the user in the second area, and display a task window or a task icon of another floating-window-displayed application with a background running process based on detecting the upward/downward swipe instruction.

8. The terminal device according to claim 6, wherein the processor executing the computer-executable instructions further causes the processor to:

detect a second drag instruction of the user for a task window or a task icon of a second application in the plurality of applications, wherein the second drag instruction is used to drag the task window or the task icon of the second application to the second clear button; and end a background running process of the second application based on detecting the second drag instruction.

9. The terminal device according to claim 6, wherein the processor executing the computer-executable instructions further causes the processor to:

detect a seventh instruction of the user for the second clear button, and end a background running process of the full-screen-displayed application in the first area based on detecting the seventh instruction.

10. A non-transitory computer-readable medium storing computer-executable instructions that, when executed by a processor, cause the processor to perform:

detecting, by a terminal device, a first instruction of a user, wherein the first instruction is used to open a multi-task interface, the multi-task interface is used to display a plurality of applications with background running processes running on the terminal device, the plurality of applications comprises a full-screen-displayed application running on the terminal device and a floating-window-displayed application running on the terminal device, the full-screen-displayed application is an application in a full-screen-displayed state, and the floating-window-displayed application is an application in a floating-window-displayed state;

displaying, by the terminal device, the multi-task interface based on detecting the first instruction, wherein the multi-task interface comprises a first area, a second area, and a third area, wherein the second area is highlighted, a task window or a task icon of the full-screen-displayed application in the plurality of applications is displayed in the first area, a task window or a task icon of the floating-window-displayed application in the plurality of applications is displayed in the second area, and the third area is used to display a task window or a task icon of at least one keep-alive application;

detecting, by the terminal device, a second instruction of the user, wherein the second instruction is used to select the second area;

displaying, by the terminal device, a first clear button in the second area based on detecting the second instruction; and detecting, by the terminal device, a third instruction of the user for the first clear button, and ending a background running process of the floating-window-displayed application in the second area based on detecting the third instruction;

wherein a second clear button is displayed in the multi-task interface;

wherein before the detecting, by the terminal device, the second instruction of the user, the processor is further configured to perform:

detecting, by the terminal device, a fourth instruction of the user, wherein the fourth instruction is used to select at least one application in the plurality of applications;

displaying, by the terminal device, a selection button of each application in the plurality of applications on a task window or a task icon of each application based on detecting the fourth instruction;

detecting, by the terminal device, at least two fifth instructions of the user for at least two selection buttons, wherein the fifth instructions are used to select a task window or a task icon of at least one full-screen-displayed application in the first area and a task window or a task icon of at least one floating-window-displayed application in the second area;

selecting, by the terminal device, task windows or task icons of applications corresponding to the at least two selection buttons based on detecting the at least two fifth instructions; and detecting, by the terminal device, a sixth instruction of the user for the second clear button, and ending background running processes of the applications corresponding to the at least two selection buttons based on detecting the sixth instruction; and wherein before the detecting, by the terminal device, the second instruction of the user, the processor is further configured to perform:

detecting, by the terminal device, a first drag instruction of the user for a task window or a task icon of a first application in the plurality of applications, wherein the first drag instruction is used to drag the task window or the task icon of the first application to the third area; and moving, by the terminal device, the task window or the task icon of the first application from the second area to the third area based on detecting the first drag instruction.

11. The non-transitory computer-readable medium according to claim 10, wherein before the detecting, by the terminal device, the second instruction of the user, the processor is further configured to perform:

detecting, by the by the terminal device, a second drag instruction of the user for a task window or a task icon of a second application in the plurality of applications, wherein the second drag instruction is used to drag the task window or the task icon of the second application to the second clear button; and ending, by the terminal device, a background running process of the second application based on detecting the second drag instruction.

12. The non-transitory computer-readable medium according to claim 10, wherein before the detecting, by the terminal device, the at least two fifth instructions of the user for at least two selection buttons, the processor is further configured to perform:

detecting, by the terminal device, a leftward/rightward swipe instruction of the user in the first area, and displaying a task window or a task icon of another full-screen-displayed application with a background running process based on detecting the leftward/rightward swipe instruction; and detecting, by the terminal device, an upward/downward swipe instruction of the user in the second area, and displaying a task window or a task icon of another floating-window-displayed application with a background running process based on detecting the upward/downward swipe instruction.

13. The non-transitory computer-readable medium according to claim 10, wherein after the ending the background running process of the floating-window-displayed application in the second area based on detecting the third instruction, the processor is further configured to perform:

detecting, by the terminal device, a seventh instruction of the user for the second clear button, and ending a background running process of the full-screen-displayed application in the first area based on detecting the seventh instruction.

* * * * *